(12) United States Patent
Sugiyama et al.

(10) Patent No.: US 6,659,647 B2
(45) Date of Patent: Dec. 9, 2003

(54) CERAMIC DYNAMIC PRESSURE BEARING, MOTOR WITH BEARING, HARD DISK DEVICE, AND POLYGON SCANNER

(75) Inventors: Atsutoshi Sugiyama, Gifu (JP); Hironobu Ishikawa, Nagoya (JP); Tetsuji Yogo, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 49 days.

(21) Appl. No.: 10/091,022

(22) Filed: Mar. 6, 2002

(65) Prior Publication Data

US 2002/0154840 A1 Oct. 24, 2002

(30) Foreign Application Priority Data

Mar. 8, 2001 (JP) ........................................ 2001-065000

(51) Int. Cl.[7] ............................................... F16C 17/02
(52) U.S. Cl. ........................ 384/114; 384/902; 384/913
(58) Field of Search ................................. 384/114, 107, 384/913, 902, 907.1

(56) References Cited

U.S. PATENT DOCUMENTS 5,688,053 A  11/1997  Itoh et al.

FOREIGN PATENT DOCUMENTS

| JP | 6-60404 | 8/1994 |
|---|---|---|
| JP | 8-93750 | 4/1996 |
| JP | 9-126229 | 5/1997 |
| JP | 2822765 | 9/1998 |

*Primary Examiner*—Lenard A. Footland
(74) *Attorney, Agent, or Firm*—Sughrue Mion, PLLC

(57) ABSTRACT

A ceramic dynamic pressure bearing, includes: a first member having an outer periphery formed with a gap forming surface causing a radial dynamic pressure, and a second member having an inner periphery defining a through hole formed with a gap forming surface causing the radial dynamic pressure. The first member is inserted into the through hole as to form a radial gap. The first member and the second member make rotation relative to each other to cause a fluid dynamic pressure at the radial gap. The first member and the second member are composed of an alumina ceramic including: an aluminum 90% to 99.5% by weight, and an oxide sintering assistant 0.5% to 10% by weight. The outer periphery has cylindricity not larger than 1.0 $\mu$m, and roundness not larger than 0.5 $\mu$m. The inner periphery has cylindricity not larger than 1.5 $\mu$m, and roundness not larger than 1.0 $\mu$m.

35 Claims, 9 Drawing Sheets

FIG. 1
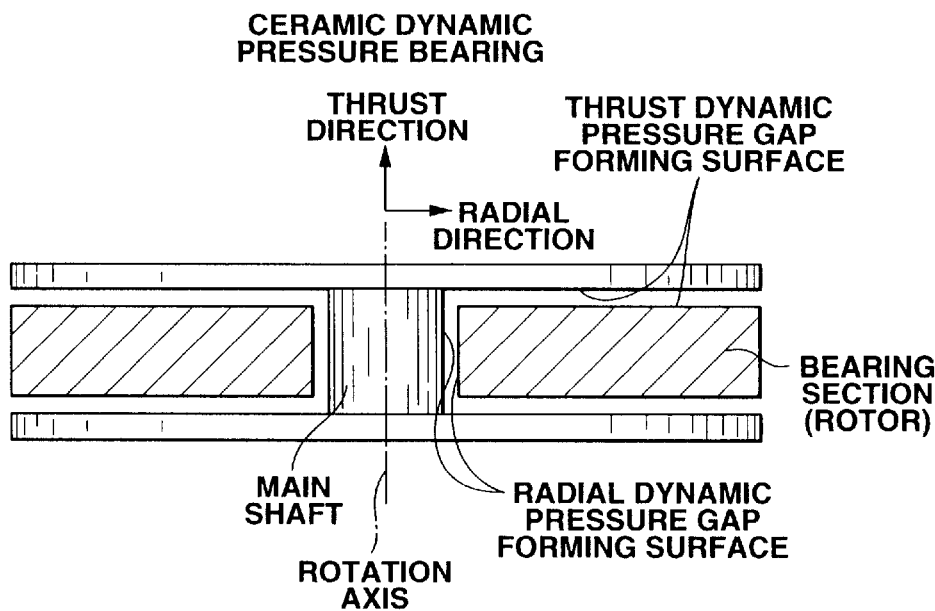
FIG. 2(a)
FIG. 2(b)
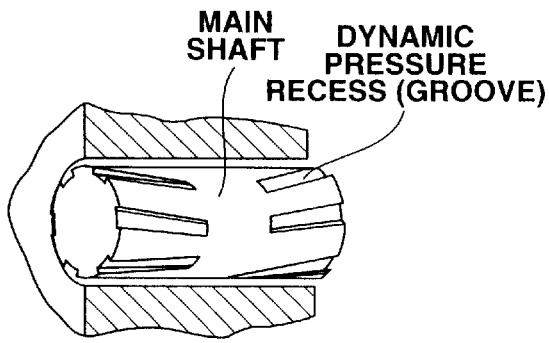
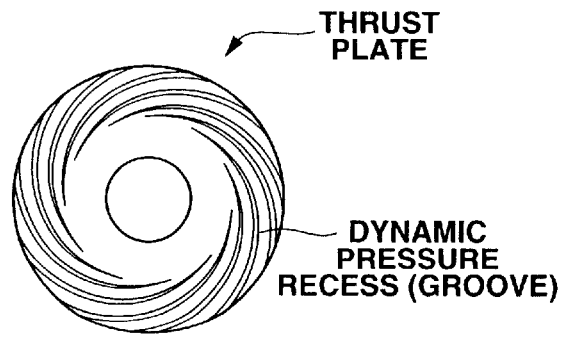

$$d = \frac{dmax + dmin}{2}$$

CERAMIC DYNAMIC PRESSURE BEARING, MOTOR WITH BEARING, HARD DISK DEVICE, AND POLYGON SCANNER

BACKGROUND OF THE INVENTION

1. Field of the Invention

The present invention relates to a ceramic dynamic pressure bearing, a motor with the bearing, a hard disk device, and a polygon scanner.

2. Description of the Related Art

Conventionally, a bearing for a motor which is a drive source of an electric appliance is in a form of a ball (or a "ball bearing").

Recently, a precision instrument such as peripheral device of computer has a motor that is rapidly increased in speed. For obtaining an excellent bearing capability (with reduction in: non-uniformity at low speed, abnormal noise, and vibration) and for keeping longevity, a dynamic pressure bearing is used. The dynamic pressure bearing is the one that uses fluid (such as air) as medium.

For example, the following dynamic pressure bearing is provided:

A main shaft and a bearing section (surrounding the main shaft) rotate around an axis. A fluid dynamic pressure is caused to a gap between an outer periphery of the main shaft and an inner periphery of the bearing section. The thus caused fluid dynamic pressure supports a rotation shaft.

Moreover, there is provided another bearing having a thrust surface (of the main shaft or the bearing section) that is supported with dynamic pressure.

At high speed with sufficient dynamic pressure, the dynamic pressure bearing is unlikely to cause contact between members facing each other across the dynamic pressure gap. Contrary to this, at low speed (such as starting and shutdown of rotation), the dynamic pressure bearing is likely to cause the contact between the members, due to insufficient dynamic pressure.

For component part of the above dynamic pressure bearing, a metal such as stainless metal, and a metal coated with resin and the like were generally used as material. The above metallic material are, however, likely to cause failures such as wear and seizure, attributable to the contact between the members at staring or shutdown. For preventing the wear and the seizure, a lubricant layer such as resin was applied to a section (of the member) facing the dynamic pressure gap, leaving insufficient effect.

For preventing the wear and the seizure securely, the members (the main shaft and the bearing) facing each other across the dynamic pressure gap are made of ceramic such as alumina.

The conventional dynamic pressure bearing with the dynamic pressure part made of the alumina ceramic is, however, not paid attention to in terms of material design, in other words, in respect of machining finish (accuracy/precision). Especially, the gap (between the outer periphery of the main shaft and the inner periphery of the bearing) causing a radial dynamic pressure is likely to cause a local wear attributable to low machining accuracy/precision of the outer periphery (of the main shaft) and the inner periphery (of the bearing section). Moreover, the low machining accuracy/precision of the outer periphery (of the main shaft) and the inner periphery (of the bearing section) may cause harmful effect on the dynamic pressure, losing uniformity and stability of rotation.

BRIEF SUMMARY OF THE INVENTION

It is an object of the present invention to provide a ceramic dynamic pressure bearing that is unlikely to cause wear, seizure and the like at low speed at starting, shutdown and the like of rotation.

It is another object of the present invention to provide the ceramic dynamic pressure bearing that achieves a preferable rotation.

According to a first aspect of the present invention, there is provided a ceramic dynamic pressure bearing, comprising: a first member having a substantially cylindrical outer periphery which is formed with a gap forming surface for causing a radial dynamic pressure, and a second member having an inner periphery defining a substantially cylindrical through hole which is formed with a gap forming surface for causing the radial dynamic pressure. The first member is inserted into the through hole of the second member in such a manner as to form a radial gap between the gap forming surface of the first member and the gap forming surface of the second member. The first member and the second member make a rotation relative to each other so as to cause a fluid dynamic pressure at the radial gap. The first member is composed of an alumina ceramic comprising: an aluminum in a range from 90% to 99.5% by weight, where the figures in % are an $Al_2O_3$ conversion, and an oxide sintering assistant in a range from 0.5% to 10% by weight, where the figures in % are an oxide conversion. The outer periphery of the first member has a cylindricity not larger than 1.0 $\mu$m, and a roundness not larger than 0.5 $\mu$m which is measured in an arbitrary cross section perpendicular to an axis of the first member. The second member is composed of the alumina ceramic comprising: the aluminum in the range from 90% to 99.5% by weight, where the figures in % are the $Al_2O_3$ conversion, and the oxide sintering assistant in the range from 0.5% to 10% by weight, where the figures in % are the oxide conversion. The inner periphery defining the through hole of the second member has a cylindricity not larger than 1.5 $\mu$m, and a roundness not larger than 1.0 $\mu$m which is measured in an arbitrary cross section perpendicular to an axis of the second member.

According to a second aspect of the present invention, there is provided a motor comprising the ceramic dynamic pressure bearing as described above. The ceramic dynamic pressure bearing is used for bearing an output section of the motor.

According to a third aspect of the present invention, there is provided a hard disk device, comprising: a motor and a hard disk rotatably driven by the motor. The motor comprises the ceramic dynamic pressure bearing as described above.

According to a fourth aspect of the present invention, there is provided a polygon scanner, comprising: a motor and a polygon mirror rotatably driven by the motor. The motor comprises the ceramic dynamic pressure bearing as described above.

The roundness and the cylindricity are those specified, respectively, in item 3 and item 4 in "Attached Table" in JIS B 0021 (1984), where JIS stands for Japanese Industrial Standard.

For securing accurate/precise measurement of the roundness and the cylindricity, the following measures may be taken:

The roundness and the cylindricity of the inner surface of the through hole of a second member are measured with a conventional profile measurement device for measuring profile of the inner surface. Hereinabove, the cylindricity is measured in cross sections (in required and sufficient number for securing accuracy/precision) perpendicular to the axis of the through hole of the second member.

Likewise, the roundness and the cylindricity of the outer surface of a first member may be measured with the conventional profile measurement device for measuring profile of the outer surface. Hereinabove, the cylindricity is measured in cross sections (in required and sufficient number for securing accuracy/precision) perpendicular to the axis of the first member.

If a hereinafter described dynamic pressure recess (groove) is to be formed, the roundness and the cylindricity are evaluated by excluding the area covering the dynamic pressure recess (groove).

According to the inventor of the present invention, the following points may be important in order to prevent the local wear from a radial dynamic pressure gap forming surface, and to secure uniform and stable dynamic pressure as well as rotation:

To keep the machining accuracy/precision of the radial dynamic pressure gap forming surface not lower than a predetermined level. More specifically, the cylindricity of the inner surface of the through hole of the second member are kept not larger than 1.5 µm, while the roundness of the inner surface of the through hole of the second member in the arbitrary cross section perpendicular to the axis are kept not larger than 1.0 µm. On the other hand, the cylindricity of the outer surface of the first member are kept not larger than 1.0 µm, while the roundness of the first member in the arbitrary cross section perpendicular to the axis are kept not larger than 0.5 µm.

Furthermore, the inventor of the present invention after further study found the following point may be effective for securing the machining accuracy/precision described above:

When the first member and the second member are made of alumina ceramic, alumina content is adjusted to 90% to 99.5% by weight.

Adjusting the alumina content in a range from 90% to 99.5% (or adjusting sintering assistant content) is attributable to the following cause:

If the sintering assistant is so increased excessively as to cause shortage of the alumina content, a liquid phase which may be caused during firing is increased. With the thus increased liquid phase, crystal grain of sintered body will grow excessively.

The above summarizes that the high content of the sintering assistant and the excessive growth of the crystal grain are responsible for lower hardness of ceramic organization. Therefore, the ceramic organization may make grinding resistance low, where the grinding resistance is required for finishing (using a grind stone or an abrasive grain) the dynamic pressure gap forming surface. With the low grinding resistance, the polishing speed is likely to become high unnecessarily, causing lower accuracy/precision of the polished surface. In other words, for improving the finish of the polished surface, the ceramic material has a proper hardness.

Therefore, securing the alumina content in the ceramic at least 90% by weight, or limiting the sintering assistant content not higher than 10% by weight may help prevent the above described excessive growth of the crystal grain.

Moreover, the "at least 90%" of the alumina content by weight or the "not higher than 10%" of the sintering assistant by weight contributes to achieving the cylindricity (not larger than 1.5 µm) of the inner surface of the through hole of the second member, and the roundness (not larger than 1.0 µm) of the inner surface of the through hole of the second member in the arbitrary cross section perpendicular to the axis. On the other hand, the "at least 90%" of the alumina content by weight or the "not higher than 10%" of the sintering assistant by weight also contributes to achieving the cylindricity (not larger than 1.0 µm) of the outer surface of the first member, and the roundness (not larger than 0.5 µm) of the first member in the arbitrary cross section perpendicular to the axis.

As a result, the local wear attributable to the machining accuracy/precision of the radial dynamic pressure gap forming surface is unlikely to occur during the operation of the dynamic pressure bearing. Moreover, the dynamic pressure at the radial dynamic pressure gap, and the rotation of the bearing become uniform and stable. Moreover, the alumina ceramic having a proper hardness improves resistance to wear which may be caused by contact between the members.

Contrary to the above, an excessive alumina content with reduced sintering assistant content may cause reduction of the liquid phase. With this, the crystal grain growth is controlled, to thereby lessen a mean crystal grain diameter to a great extent. As a result, the resistance to the polishing and the grinding may become too high, to thereby deteriorate machinability to a great extent.

With the aspects described above, the mean crystal grain diameter of the alumina ceramic is preferably in a range from 1 µm to 7 µm. The alumina content is preferably in a range from 92% to 98% by weight, more preferably from 93% to 97% by weight. Furthermore, the oxide sintering assistant constituting the grain boundary phase is preferably in a range from 2% to 8% by weight (oxide conversion), more preferably from 3% to 7% by weight (oxide conversion).

Dimension of the crystal grain (or surface vacancy) in this specification is defined as is seen in FIG. 6. More specifically, the organization of the dynamic pressure gap forming surface is viewed with an SEM (=scanning electron microscope), an optical microscope and the like. On a viewing area, a pair of parallel lines are drawn to an outline of the crystal grain (or surface vacancy) without crossing inside of the crystal grain (or surface vacancy). The pair of the parallel lines are drawn plural in number from different positions relative to the outline of the crystal grain (or surface vacancy). An arithmetic mean of a maximum dimension $d_{max}$ and a minimum dimension $d_{min}$ is defined as the dimension d of the crystal grain (or surface vacancy), namely, $d=(d_{max}+d_{min})/2$.

As the oxide sintering assistant, an oxide having a cation selected from the group consisting of Li, Na, K, Mg, Ca, Sr, Ba, Sc, Y, La, Ce, Pr, Nd, Sm, Eu, Gd, Th, Dy, Ho, Er, Tm, Yb, Lu, Si and the like is usable.

In this case, the at least one of the above cations is(are), in total, included in the alumina ceramic in a range from 0.5% to 10% by weight (preferably, 2% to 8% by weight; more preferably, 3% to 7% by weight), where the figures in % is based on oxide conversion.

Of the above cations, Si forms a bone of the grain boundary phase, to thereby increase strength. Moreover, Si improves fluidity of liquid phase.

The three alkaline metals Li, Na, and K decrease melting point of the liquid phase which is generated during firing. Thereby, Li, Na and K improve fluidity of the liquid phase, to thereby make the sintered body more compact (denser). Of the three alkaline metals, Na is low in cost. On top of that, although Na is, in principle, regarded as an impurity that is contained in ordinary alumina raw material powders such as those produced through Bayer process, Na is applicable to the sintering assistant. With a composition formula $M_2O$, each of Li, Na and K is converted into oxide, where M is the cation metal element.

Following the three alkaline metals Li, Na, and K, the four alkaline earth metals Mg, Ca, Sr, and Ba feature an effect of decreasing the melting point of the liquid phase which is generated during firing. On the other hand, the four alkaline earth metals Mg, Ca, Sr, and Ba have an effect of strengthening the grain boundary phase when Mg, Ca, Sr, and Ba are absorbed in the grain boundary phase. As a result, Mg, Ca, Sr, and Ba improve strength and wear resistance of the entire sintered body and the dynamic pressure gap forming surface. Of the four alkaline earth metals, Ca shows the greatest effect. With a composition formula MO, each of the four alkaline earth metals Mg, Ca, Sr, and Ba is converted into oxide, where M is the cation metal element.

The rare earth metals Sc, Y, La, Ce, Pr, Nd, Sm, Eu, Gd, Tb, Dy, Ho, Er, Tm, Yb, and Lu have advantages such as accelerating crystallization of the grain boundary phase, and increasing strength of the grain boundary phase. As a result, Sc, Y, La, Ce, Pr, Nd, Sm, Eu, Gd, Th, Dy, Ho, Er, Tm, Yb, and Lu improve strength and wear resistance of the entire sintered body and the dynamic pressure gap forming surface. Of the rare earth metals, Ce shows the greatest effect. With a composition formula $M_2O_3$, each of the rare earth metals is converted into oxide, where M is the cation metal element.

Preferably, the alumina ceramic has an apparent density 3.5 g/cm$^3$ to 3.9 g/cm$^3$ (comparatively high). The thus highly controlled apparent density contributes to improvement in absolute values of strength and wear resistance of the alumina ceramic which constitutes the dynamic pressure gap forming surface. Moreover, the highly controlled apparent density effectively prevents wear from the dynamic pressure gap forming surface, which wear may be caused at starting and shutdown of rotation when members are likely to contact each other.

The alumina ceramic with an ideal compaction has a maximum density 4.0 g/cm$^3$. Such a perfect compaction of the alumina ceramic, however, involves high sintering temperature, to thereby cause the crystal grain growth (unavoidable). With this, as the case may be, securing the accuracy/precision {1. Cylindricity (not larger than 1.5 $\mu$m) of the inner surface of the through hole of the second member. 2 Roundness (not larger than 1.0 $\mu$m) of the inner surface of the through hole of the second member in the arbitrary cross section perpendicular to the axis. 3. Cylindricity (not larger than 1.0 $\mu$m) of the outer surface of the first member. 4. Roundness (not larger than 0.5 $\mu$m) of the first member in the arbitrary cross section perpendicular to the axis.} of the radial dynamic pressure gap forming surface is of difficulty.

The alumina ceramic having the apparent density not higher than 3.9 g/cm$^3$ does not involve high sintering temperature. Therefore, the crystal grain growth is controlled, to thereby secure the accuracy/precision (see former paragraph) of the radial dynamic pressure gap forming surface with convenience.

On the contrary, the alumina ceramic having the apparent density lower than 3.5 g/cm$^3$ decreases the strength and the wear resistance of the alumina ceramic. Thereby, as the case may be, the wear is rather likely to occur to the dynamic pressure gap forming surface at starting and shutdown of rotation.

More preferably, the alumina ceramic has the apparent density in a range from 3.6 g/cm$^3$ to 3.9 g/cm$^3$.

Not only being sensitive to progress of the compaction, the apparent density of the alumina ceramic is more or less sensitive to types of the added sintering assistants as well as content of the added sintering assistant. When the correlation of ceramic compactness and crystal grain growth is at issue, a relative density is used. Herein, the relative density is a quotient which is obtained through a calculation dividing the apparent density by a true density, which true density is estimated from a composition ratio of the alumina and the sintering assistant. Under the present invention, the relative density of the alumina ceramic is not lower than 90%; more preferably, 90% to 98%; still more preferably, 94% to 97%.

The alumina ceramic whose density is adjusted as described above has the following features: 1. A relatively high flexural strength 280 MPa to 550 MPa. 2. Rockwell hardness 92 to 98 measured with load 15 N applied. 3. Fracture toughness 3 MPa·m$^{1/2}$ to 5 MPa·m$^{1/2}$. The alumina ceramic having the above flexural strength, Rockwell hardness and fracture toughness helps prevent and control wear (which may be caused on the dynamic pressure gap forming surface at starting and shutdown of rotation), and secures sufficient accuracy/precision of the radial dynamic pressure gap forming surface, without lowering excessively the machinability of polishing and grinding.

The flexural strength described in this specification means a 3-point flexural strength measured at room temperature based on a method specified in JIS R 1601 (1981).

The Rockwell hardness described in this specification is measured at room temperature based on a method specified in JIS Z 2245 (1992).

The fracture toughness described in this specification is measured based on an IF (=intermediate frequency) method specified in JIS R 1607 (1990).

The ceramic dynamic pressure bearing under the present invention has the second member in the direction of a rotation axis. At least one of two end surfaces of the second member faces a surface of a thrust plate. The end surface of the second member and the surface (facing the end surface of the second member) of the thrust plate constitute thrust dynamic pressure gap forming surfaces forming therebetween a thrust dynamic pressure gap.

Described hereinafter referring to FIG. 1 is a constitution of the ceramic dynamic pressure bearing.

The radial direction is perpendicular to the direction (upward and downward in FIG. 1) of the rotation axis of a main shaft. In FIG. 1, the outer periphery of the main shaft (first member) and the inner periphery of the bearing section (second member) are the radial dynamic pressure gap forming surfaces. The main shaft is fixed, while the bearing section is a rotor in a form of a cylinder.

If the ceramic dynamic pressure bearing is long in the direction of the rotation axis, whether a sufficient radial dynamic pressure is caused or not is of importance for stabilizing the rotation axis. The thrust direction is along the axis of the main shaft, in other words, the rotation direction (upward and downward in FIG. 1). In FIG. 1, the end surface of the bearing section and the surface (of the thrust plate) facing the end surface of the bearing section form the thrust dynamic pressure gap forming surfaces. The thrust dynamic pressure gap forming surface is allowed to have a slight inclination relative to a surface perpendicular to the rotation axis.

When the ceramic dynamic pressure bearing is short in the direction of the rotation axis, whether a sufficient thrust dynamic pressure is caused or not is of importance for stabilizing the rotation axis.

As is seen in FIG. 10, there is provided a bearing 251 having a main shaft 212 which is a rotor, and a cylindrical bearing section 221 which is fixed. The bearing 251 having the above constitution is allowed.

Hereinafter, as the case may be, the radial dynamic pressure gap and the thrust dynamic pressure gap are in combination referred to as "dynamic pressure gap," and likewise, the radial dynamic pressure gap forming surface and the thrust dynamic pressure gap forming surface are in combination referred to as "dynamic pressure gap forming surface."

Under the present invention, the alumina ceramic has a mean crystal grain diameter preferably in a range from 1 μm to 7 μm. More specifically, when the alumina ceramic is used for a material of the dynamic pressure bearing, surface condition of the ceramic dynamic pressure gap forming surfaces (of the main shaft and the bearing section) is of importance. In other words, the ceramic surface after polishing generally has minor vacancies which are supposed to cause a great effect to the rotation of the dynamic pressure bearing.

On the other hand, the dynamic pressure gap forming surface having an excessive smoothness, as the case may be, does not cause a sufficient fluid dynamic pressure to the dynamic pressure gap, according to study by the inventor of the present invention. When the dynamic pressure level is not sufficient, the rotation axis is not stable. With this, securing a stable rotation of the dynamic pressure bearing becomes difficult. Therefore, in order to keep the fluid dynamic pressure at high level, forming surface vacancies (having predetermined dimensions) aggressively on the dynamic pressure gap forming surface is effective.

The dynamic pressure gap forming surface is coated with a film which is thinner than a mean dimension of the surface vacancies. Preferably, the film is an amorphous carbon which is mainly made of hard carbon. Described below is a reason therefor:

Even if the dynamic pressure gap forming surfaces contact each other at low rotation (such as starting and shutdown) when the dynamic pressure is likely to get low, the amorphous hard carbon film helps prevent wear and adhesion.

Herein, the hard carbon (made of amorphous carbon) film has a main body which constitutes an amorphous skeleton, and has Vickers hardness not lower than 1,500 kg/mm². The hardness of the film is measured with a dynamic ultra-minor hardness tester and the like (for example, NHT produced by CSEM in Switzerland).

Designing the film thinner than the mean dimension of the surface vacancies is for the following cause:

For preventing the surface vacancies from being excessively closed, which surface vacancies are formed aggressively for keeping the fluid dynamic pressure at high level, as described above.

Described below is in terms of the "predetermined dimensions" of the surface vacancies:

A method of forming the hard carbon film disclosed in Japanese Patent Examined Publication No. Heisei 6(1994)-060404 (equivalent of JP62116767 and JP1940883C) is usable. For depositing the hard carbon film without excessively closing the surface vacancies (that contribute to keeping fluid dynamic pressure at high level), however, the following method is more effective:

Allowing material steam (to be accumulated) to flow in such a manner as to form an inclined incident angle relative to a surface of a member.

More specifically, the ceramic dynamic pressure gap forming surface formed with large surface vacancies may disorder a fluid layer between the main shaft and the bearing. Thereby, a vibration may occur, for example, to the main shaft.

On the other hand, the ceramic dynamic pressure gap forming surface formed with small surface vacancies may cause an adhesion on the dynamic pressure gap forming surface of each of the main shaft and the bearing. Turning the bearing with the adhesion may cause the wear (hereinafter referred to as "adhesion wear") and the like.

Furthermore, the ceramic dynamic pressure gap forming surface formed with extremely small vacancies does not contribute to causing the dynamic pressure.

The surface vacancies on the dynamic pressure gap forming surface are mainly formed by grain drop during polishing. Therefore, dimension (diameter) and distribution of the alumina ceramic crystal grain on the dynamic pressure gap forming surface are factors for forming the preferable surface vacancies, without failures described above. Under the present invention, controlling the mean diameter of the ceramic crystal grains (constituting the dynamic pressure gap forming surface of the member) in a range from 1 μm to 7 μm may contribute to an advantageous dimension and amount of the surface vacancies, in view of stability of the fluid dynamic pressure at high level and effective prevention of failures such as adhesion wear and linking at starting and shutdown of the dynamic pressure bearing.

The ceramic crystal grains having the mean diameter smaller than 1 μm form the surface vacancies too small in mean diameter. Thereby, the adhesion wear and the linking are likely to occur at starting and shutdown of rotation of the dynamic pressure bearing. Moreover, with the ceramic crystal grains smaller than 1 μm in mean diameter, the fluid dynamic pressure level is likely to become low, to thereby cause rotational deflection and the like. Hereinabove, the rotational deflection is defined as a maximum amplitude of a measuring point, and is perpendicular to the rotation axis.

On the other hand, the ceramic crystal grains having mean diameter larger than 7 μm form the surface vacancies too large in mean diameter. Thereby, an excessive turbulent flow may occur at the dynamic pressure gap, to thereby cause vibration of the rotation axis.

The mean diameter of the ceramic crystal grains is preferably 2 μm to 5 μm.

On the dynamic pressure gap forming surface, a percentage area of the ceramic crystal grains having the grain diameter 2 μm to 5 μm not smaller than 40% (including 100%) is preferable for achieving the advantageous dimension and amount of the surface vacancies.

When the percentage area of the ceramic crystal grains having grain diameter 2 μm to 5 μm is smaller than 40% (in other words, when percentage area of the ceramic crystal grains having grain diameter larger than 5 μm become great), the ceramic crystal grains are less likely to drop. Thereby, as the case may be, the percentage area of the surface vacancies that effectively contribute to causing the dynamic pressure becomes too small. On the other hand, when percentage area of the ceramic crystal grains having grain diameter smaller than 2 μm become great, the formed surface vacancies are likely to become small in mean diameter. Both the above two cases, as the case may be, are disadvantageous for causing sufficient dynamic pressure.

The alumina ceramic is produced by firing a raw material which is a blending of alumina powders and sintering assistant powders. As is seen in FIG. 11, the thus produced alumina ceramic has an organization in which crystal grain of an alumina main phase (main element: alumina) is coupled with a grain boundary phase which is derived from the sintering assistant. Presumably, the crystal grain drop during polishing is mainly caused by fracture of the grain boundary phase. A space which was occupied by the crystal grain thus dropped remains as the vacancy that is open on the dynamic pressure gap forming surface.

The crystal grain drop is likely to occur especially in the following cases and the like where the strength of the grain boundary phase is low and coupling between the grain boundary phases is relatively decreased:

1. The grain boundary phase has a portion that is locally thin.
2. The grain boundary phase is insufficient due to an inner cavity and the like.
3. Cracks are caused by element segregation, thermal stress and the like.

In the specification, the term "main component (likewise, main, mainly and the like)" is defined as a material having a content not smaller than 50% by weight, unless otherwise defined.

For example, as is seen in FIG. 12(a), a single crystal grain drops, to thereby form a single vacancy V1 having configuration and dimension corresponding to those of the single crystal grain thus dropped. Moreover, a plurality of crystal grains drops, to thereby form a group vacancy V2. Hereinabove in FIG. 12(a), white (void) areas indicate crystal grains that remain 'not dropped,' while black (dark) areas indicate crystal grains 'dropped.'

FIG. 12(b) shows an ordinary condition where crystal grains having various dimensions are mixed in the organization. When a crystal grain having a large dimension is surrounded by a plurality of crystal grains having smaller dimensions, the surrounding smaller crystal grains drop with a chain reaction. Thereby, the surrounded large crystal grain drops, as the case may be. In this case, the vacancy thus formed has a dimension larger than those of individual crystal grains.

In the following situation, the group vacancy V2 (plurality of vacancies) is more likely to occur than the single vacancy V1 when a polishing force from the grind stone and the abrasive grain is applied to across a plurality of the crystal grains:

The alumina ceramic has an organization in which the individual crystal grain is equiaxial (namely, small anisotropy in configuration) and in which a portion having the decreased grain boundary phase coupling is spread to a predetermined extent.

In this case, the surface vacancies become larger in mean diameter than the crystal grains (mean diameter 1 $\mu$m to 7 $\mu$m).

Furthermore, the surface vacancies are so formed as to scatter substantially in the same direction (isotropic) on the dynamic pressure gap forming surface, irrespective of the polishing direction. With the surface vacancies larger than the crystal grains in mean diameter, the dynamic pressure level is further improved, to thereby achieve more stabilized rotation of the bearing.

When the alumina ceramic is produced, the mean grain diameter of the alumina powders used for the raw material is preferably in a range from 1 $\mu$m to 5 $\mu$m. In the case that the alumina powder having the mean diameter out of 1 $\mu$m to 5 $\mu$m are used, the mean diameter of the crystal grains of the sintered body obtained is not in the preferred range 1 $\mu$m to 7 $\mu$m (2 $\mu$m to 5 $\mu$m), as the case may be. A laser diffraction grain meter is used for measuring the mean grain diameter of the alumina powders.

The firing temperature is preferably in a range from 1,400° C. to 1,700° C. The firing temperature lower than 1,400° C. is likely to decelerate compaction of the sintered body, to thereby reduce strength and wear resistance. On the other hand, the firing temperature higher than 1,700° C. causes excessive crystal grain growth. Thereby, controlling the mean grain diameter of the crystal grains of the sintered body in a range from 1 $\mu$m to 7 $\mu$m (2 $\mu$m to 5 $\mu$m) is, as the case may be, of difficulty. Moreover, the firing temperature higher than 1,700° C., as the case may be, causes deformation and the like of the sintered body, to thereby deteriorate dimension accuracy/precision.

The mean dimension of the surface vacancies on the dynamic pressure gap forming surface made of the ceramic is specifically in a range from 2 $\mu$m to 20 $\mu$m. Obtaining aggressively the mean dimension from 2 $\mu$m to 20 $\mu$m highly stabilizes the fluid dynamic pressure level. Moreover, in the case of the after described dynamic pressure bearing formed with the thrust dynamic pressure gap, the linking is prevented.

The mean dimension of the surface vacancies larger than 20 $\mu$m is likely to cause an excessive turbulent flow to the dynamic pressure gap, to thereby vibrate the rotation axis.

On the other hand, the mean dimension of the surface vacancies smaller than 2 $\mu$m is likely to cause the adhesion wear and the linking to the dynamic pressure gap forming surface at starting and shutdown of rotation. Moreover, the fluid dynamic pressure level at the dynamic pressure gap is likely to become low, to thereby cause rotational deflection (a maximum amplitude of a measuring point, and is perpendicular to the rotation axis) and the like. More preferably, the mean dimension of the surface vacancies is in a range from 5 $\mu$m to 15 $\mu$m.

The individual surface vacancies smaller than 2 $\mu$m do not contribute so much to causing the dynamic pressure. On the other hand, so many surface vacancies larger than 20 $\mu$m are likely to cause vibration and the like. The above two sentences summarize that the preferable dimension of the surface vacancy is from 2 $\mu$m to 20 $\mu$m for effective contribution to causing the dynamic pressure and to the stabilized rotation.

The percentage area of the surface vacancies from 2 $\mu$m to 20 $\mu$m on the dynamic pressure gap forming surface is not lower than 15%, and preferably, not lower than 20%, in view of the following aspects and the like:

1. Prevent seizure and linking from the dynamic pressure gap forming surface at starting and shutdown of rotation.
2. Increase fluid dynamic pressure level caused to the dynamic pressure gap.

On the other hand, the percentage area of the surface vacancies from 2 $\mu$m to 20 $\mu$m on the dynamic pressure gap forming surface is not higher than 60%, preferably not higher than 40%, in view of controlling more effectively the vibration and the like.

For effectively contributing to causing the dynamic pressure and for stabilizing the rotation, the surface vacancies have dimension in a range from 2 $\mu$m to 20 $\mu$m, and have the percentage area in a range from 10% to 60%.

In the specification, the percentage area of the surface vacancies is defined as a total area of the surface vacancies (observed on the dynamic pressure gap forming surface) divided by the area of the dynamic pressure gap forming surface. When a conventional dynamic pressure recess (groove) is formed on the dynamic pressure gap forming surface, however, an area covering the dynamic pressure recess (groove) is subtracted from the area of the dynamic pressure gap forming surface in the above calculation.

Measurement of the percentage area is carried out, for example, in the following manner:

1. Observe the dynamic pressure gap forming surface with a magnifying glass such as an optical microscope and the like.

2. Define a measurement area in a form of a square 300 μm×300 μm within an observatory view.
3. Divide the total area of the surface vacancies identified in the measurement area, by the measurement area.

For improving measurement accuracy/precision, the following steps are taken:
1. Arbitrarily define not less than five measurement areas in a single dynamic pressure gap forming surface, so as to obtain the percentage area of the surface vacancies.
2. Calculate a mean percentage area of the surface vacancies in the not less than five measurement areas.

On the dynamic pressure gap forming surface, the surface vacancy larger than 20 μm is preferably prevented that may cause vibration and the like. More specifically, the percentage area of the surface vacancies larger than 20 μm is preferably in not higher than 10%, more preferably, not higher than 5%. For preventing vibration, the maximum dimension of the surface vacancy on the dynamic pressure gap forming surface is preferably not larger than 100 μm. In other words, the surface vacancy larger than 100 μm is preferably not formed on the dynamic pressure gap forming surface.

Each of the first member and the second member forming the dynamic pressure gap is entirely made of the alumina ceramic. The alumina ceramic has an inner organization which is the compact sintered body with a small number of vacancies, and an outer organization which is the dynamic pressure gap forming surface formed with relatively a large number of vacancies. The above inner organization and outer organization of the alumina ceramic are preferable for increasing the dynamic pressure level, for preventing the adhesion wear and linking, and for improving the strength and wear resistance.

More specifically, the following condition is preferable:
In the alumina ceramic sintered body, the vacancies (having dimension from 2 μm to 20 μm) are locally formed as the 'surface vacancies' on the dynamic pressure gap forming surface.

For efficiently forming the above organization, an effective measure is to form the surface vacancies by dropping the alumina ceramic crystal grains when finishing the dynamic pressure gap forming surface, as described above.

In the specification, the dynamic pressure bearing is allowed to be longer in the axial direction than an outer diameter of the thrust dynamic pressure gap forming surface. Otherwise, omission of the thrust dynamic pressure gap is allowed. With the constitution described in the above two sentences, the inclination of the rotor is controlled by the dynamic pressure caused to the radial dynamic pressure gap. More specifically, as is seen in FIG. 7, for example, there is provided a ceramic dynamic pressure bearing 33 having a long rotation shaft. When a bearing section 35 (rotor) is inclined, a pressure caused to a radial gap 38 regulates and rectifies the inclination of the bearing section 35.

On the other hand, in the specification, the dynamic pressure bearing is allowed to be shorter in the axial direction than the outer diameter of the thrust dynamic pressure gap forming surface. The inclination of the rotor during rotation is controlled mainly by the dynamic pressure at the thrust dynamic pressure gap. As is seen in FIG. 3, for example, there is provided a ceramic dynamic pressure bearing 3 having a short rotation shaft. When a bearing section 15 (rotor) is inclined, a pressure caused to a thrust gap 18A and a thrust gap 18B regulates and rectifies the inclination of the bearing section 35.

The dynamic pressure gap forming surface is allowed to be formed with a dynamic pressure recess (groove). For example, forming a conventional dynamic pressure recess (groove) on an outer periphery (the radial dynamic pressure gap forming surface) of the rotation shaft brings about smoother rotation.

As is seen in FIG. 2(a), there are formed a plurality of dynamic pressure recesses (grooves) which are disposed at predetermined intervals circumferentially on the outer periphery (radial dynamic pressure gap forming surface) of the shaft inserted into the bearing section. In FIG. 2(a), the recesses (grooves) are straight lines with an inclination defining a predetermined angle relative to a generating line of the outer periphery of the shaft. Other conventional patterns such as what is called herring bone are also allowed for the recesses (grooves), where the herring bone pattern has a circumferential base line at which ends of the recesses (grooves) are positioned.

Moreover, as is seen in FIG. 2(b), for example, a dynamic pressure recess (groove) is allowed to be formed on a surface (thrust dynamic pressure gap forming surface) of a thrust plate. In FIG. 2(b), a plurality of curved recesses (grooves) are formed circumferentially around a center of the thrust plate at predetermined intervals in such a manner that a distance from the center of the thrust plate is reduced gradually.

In the specification, the dynamic pressure bearing is effectively used for applications including, for example, the following accuracy/precision instruments:
1. A rotational main shaft section of a hard disk of a hard disk device.
2. A rotational main shaft section of a disk of a computer peripheral device including: CD-ROM (compact disk read only memory) drive, MO (magneto optical) drive, DVD (digital versatile disk) drive and the like.
3. A bearing for a rotational main shaft of a polygon mirror of a polygon scanner which is used for a laser printer, a copier and the like.

In the above precision instruments, a high speed not slower than 8,000 rpm is required for the bearing of the rotation drive. If more accuracy/precision is a concern, a still higher speed not slower than 10,000 rpm or not slower than 30,000 rpm is required.

Therefore, with an application of the ceramic dynamic pressure bearing in the specification, the fluid dynamic level is highly stabilized, and reduction in vibration and the like is achieved.

Moreover, in the specification, the following articles and the like are provided:
1. A motor which is equipped with the ceramic dynamic pressure bearing for bearing an output section of the motor.
2. A hard disk device which is equipped with the following articles:
   1) The motor equipped with the ceramic dynamic pressure bearing.
   2) A hard disk rotatably driven by the above bearing-equipped motor.
3. A polygon scanner which is equipped with the following articles:
   1) The motor equipped with the ceramic dynamic pressure bearing.
   2) A polygon mirror driven by the above bearing-equipped motor.

The other objects and features of the present invention will become understood from the following description with reference to the accompanying drawings.

BRIEF DESCRIPTION OF THE SEVERAL VIEWS OF THE DRAWINGS

FIG. 1 is a schematic of a cross section of a constitution of a ceramic dynamic pressure bearing under the present invention;

FIG. 2 is an example of a dynamic pressure recess (groove), in which

FIG. 2(a) shows a dynamic pressure recess (groove) formed on a radial dynamic pressure gap forming surface, and FIG. 2(b) shows a dynamic pressure recess (groove) formed on a thrust dynamic pressure gap forming surface;

FIG. 4 is an essential part of the motor 2 in FIG. 3, in which,

FIG. 5 is separated into FIG. 5(a), FIG. 5(b), FIG. 5(c) and FIG. 5(d), in which

FIG. 12 is a schematic of a vacancy formed by ceramic crystal grain drop in which.

DETAILED DESCRIPTION OF THE EMBODIMENT

Figure 3:
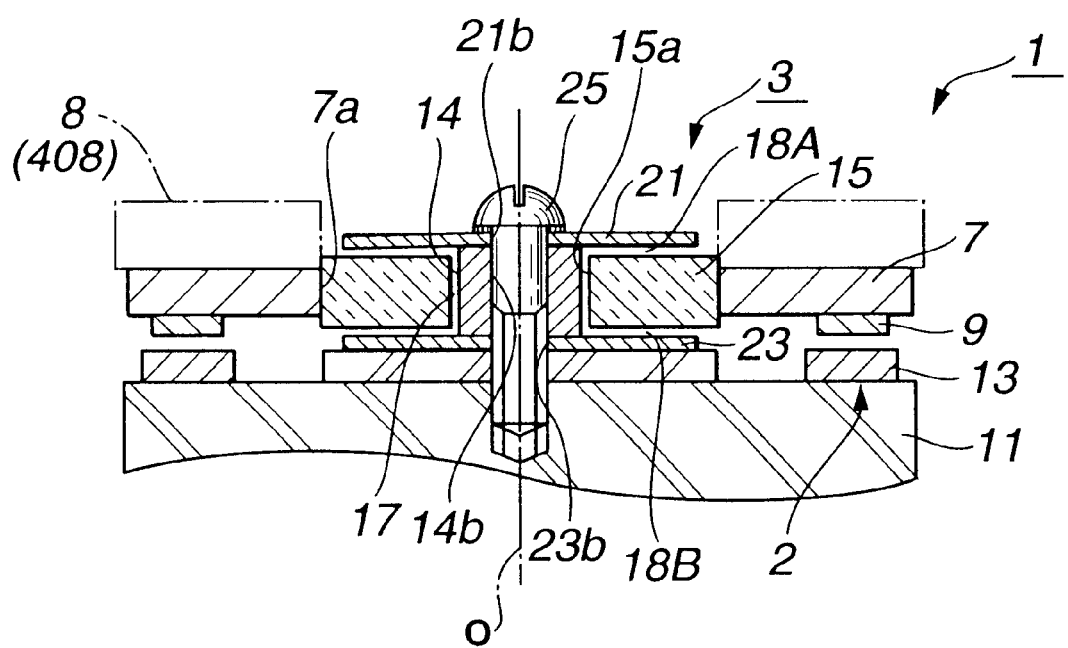
FIG. 3 is a cross section of a front view of a motor 2 (equipped with a ceramic dynamic pressure bearing 3) for a polygon scanner 1, according to a first embodiment of the present invention.

As is seen in FIG. 3, there is provided a ceramic dynamic pressure bearing 3, according to a first embodiment of the present invention.

There is provided a polygon scanner 1 having a polygon mirror 8. The ceramic dynamic pressure bearing 3 is used for a motor 2 for turning the polygon mirror 8. The ceramic dynamic pressure bearing 3 uses air as fluid for causing a dynamic pressure.

The motor 2 may have the following constitution:

A permanent magnet 9 mounts to a support section 7 which is integrated with an outer periphery of a cylindrical bearing section 15 (rotor). A coil 13 facing the permanent magnet 9 mounts to a base 11. The permanent magnet 9 and the coil 13 turn the bearing section 15. Alternatively, the permanent magnet 9 (upper in FIG. 3) and the coil 13 (lower in FIG. 3) are replaceable with each other.

The ceramic dynamic pressure bearing 3 may have the following constitution:

The cylindrical bearing section 15 (for example, inner diameter about 15 mm [see second, third, and fourth next paragraph and thereafter], outer diameter 25 mm, axial length 8 mm) is formed with a through hole 15a. A cylindrical main shaft 14 (for example, inner diameter 5 mm, outer diameter about 15 mm [see second, third, and fourth next paragraph and thereafter], axial length 8 mm) rotatably passes through the through hole 15a.

Figure 4A:
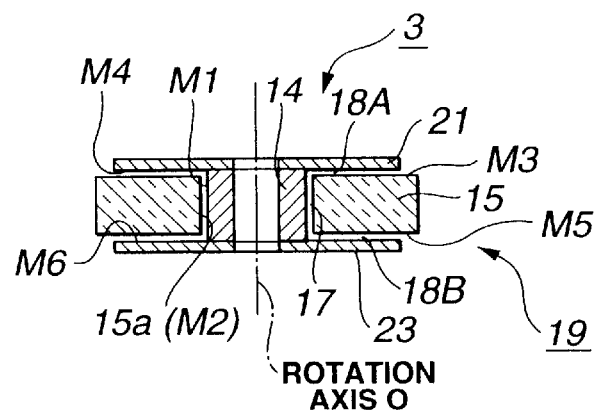
FIG. 4(a) shows a cross section of a front view of the ceramic dynamic pressure bearing 3.
Figure 4B:
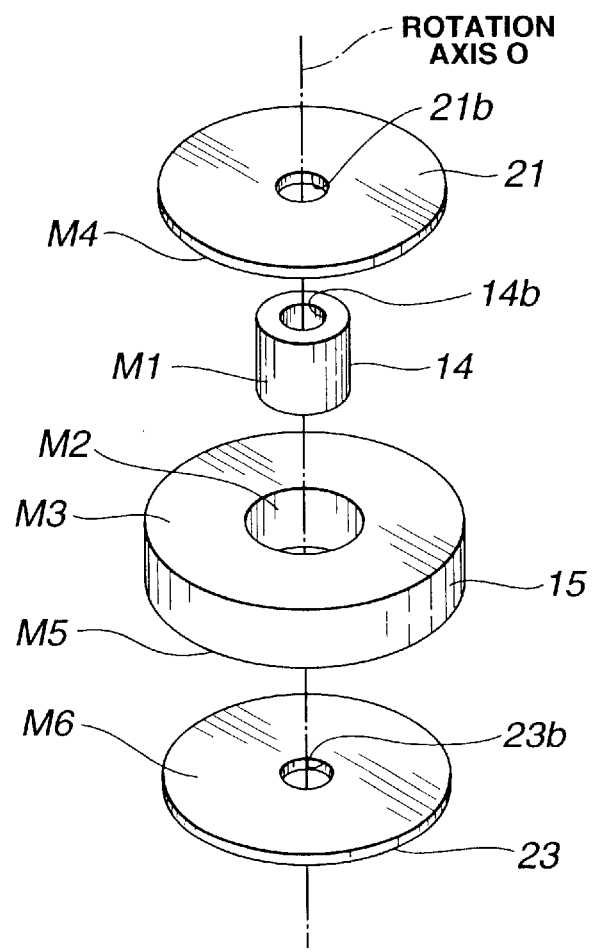
FIG. 4(b) shows a perspective exploded view of the ceramic dynamic pressure bearing 3.

As is seen in FIG. 4(a) and FIG. 4(b), the ceramic dynamic pressure bearing 3 has a cylindrical gap forming surface M1 which is an outer periphery of the main shaft 14, and a cylindrical gap forming surface M2 which is an inner periphery of the through hole 15a. The gap forming surface M1 and the gap forming surface M2 form therebetween a radial gap 17 causing a dynamic pressure that is radial relative to a rotation axis O. The radial gap 17 is filled with air, and has a dimension, for example, about 5 μm. The main shaft 14 is referred to as "first member" in WHAT IS CLAIMED IS, while the bearing section 15 is claimed as "second member" in WHAT IS CLAIMED IS.

The radial gap 17 has a dimension (D2−D1)/2 in a range from 2 μm to 6 μm, where "D2" stands for an inner diameter of the through hole 15a of the bearing section 15 (second member) while "D1" stands for an outer diameter of the main shaft 14 (first member).

Controlling the (D2−D1)/2 not smaller than 2 μm is for preventing a local contact (of the gap forming surface M1 with the gap forming surface M2) and adhesion wear (to the gap forming surface M1 and the gap forming surface M2) from occurring, at starting and shutdown of rotation of the ceramic dynamic pressure bearing 3.

On the other hand, controlling the (D2−D1)/2 not larger than 6 μm is for generating a sufficient dynamic pressure, and for preventing failures such as a collapsed core and the like which may be caused by a local pressure fluctuation.

Moreover, allowing each of the outer periphery (gap forming surface M1) of the main shaft 14 (first member) and the inner periphery (gap forming surface M2) of the through hole 15a of the bearing section 15 (second member) to form a taper having a dimension smaller than 2 μm may reduce effectively the local wear caused at starting and shutdown of rotation of the ceramic dynamic pressure bearing 3. Herein, the taper is defined as (δ1−δ2)/2, where δ1 is a diameter at a side end defining a larger diameter (of each of the main shaft 14 and the bearing section 15) while δ2 is a diameter at a side end defining a smaller diameter (of each of the main shaft 14 and the bearing section 15).

On the other hand, the main shaft 14 has a first end surface {upper in FIG. 4(a) and FIG. 4(b)} integrated with a thrust plate 21 (for example, inner diameter 5 mm, outer diameter 25 mm, thickness 2 mm) which is shaped substantially into a disk, and a second end surface {lower in FIG. 4(a) and FIG. 4(b)} integrated with a thrust plate 23 (for example, inner diameter 5 mm, outer diameter 25 mm, thickness 2 mm) which is shaped substantially into a disk. The thrust plate 21 and the thrust plate 23 are coaxial. The thrust plate 21 has a gap forming surface M4 (inner surface) opposed to a gap forming surface M3 (first end surface) of the bearing section 15, while the thrust plate 23 has a gap forming surface M6 (inner surface) opposed to a gap forming surface M5 (second end surface) of the bearing section 15.

According to the first embodiment, as is seen in FIG. 3, the thrust plate 21 defines an inner hole 21b which is overlapped with a first end surface (upper) of the main shaft 14, while the thrust plate 23 defines an inner hole 23b which is overlapped with a second end surface (lower) of the main shaft 14. A bolt 25 through a center hole 14b of the main shaft 14 is screwed into the base 11, to thereby press the thrust plate 21 and the thrust plate 23 for fixation.

How to fix the thrust plate 21 and the thrust plate 23 is not limited to the one described in the former paragraph.

As is seen in FIG. 4(a), the gap forming surface M4 (of the thrust plate 21) and the gap forming surface M3 (of the bearing section 15) form a first thrust gap 18A for causing the dynamic pressure. Likewise, the gap forming surface M6 (of the thrust plate 23) and the gap forming surface MS (of the bearing section 15) form a second thrust gap 18B for causing the dynamic pressure. Each of the first thrust gap 18A and the second thrust gap 18B is filled with air, and has a dimension, for example, about 6 $\mu$m.

Entire part of each of the main shaft 14, the bearing section 15, the thrust plate 21, and the thrust plate 23 is made of alumina ceramic with alumina content from 90% to 99.5% by weight. More preferably, the alumina content is from 92% to 98% by weight. The other contents of the alumina ceramic may include oxide sintering assistant and unavoidable impurity.

The through hole 15a of the bearing section 15 defines the inner periphery which has a cylindricity not larger than 1.5 $\mu$m, and which has a roundness not larger than 1.0 $\mu$m in an arbitrary cross section perpendicular to an axis of the bearing section 15.

On the other hand, the main shaft 14 defines the outer periphery which has a cylindricity not larger than 1.0 $\mu$m, and which has a roundness not larger than 0.5 $\mu$m in an arbitrary cross section perpendicular to an axis of the main shaft 14.

The main shaft 14 and the bearing section 15 featuring the cylindricity and the roundness described above may prevent any local wear (which may be caused, respectively, to the gap forming surface M1 and the gap forming surface M2), and bring about uniformity and stability to the dynamic pressure and the rotation of the ceramic dynamic pressure bearing 3.

Moreover, an apparent density of the alumina ceramic constituting each of the main shaft 14, the bearing section 15, the thrust plate 21, and the thrust plate 23 is from 3.5 g/cm$^3$ to 3.9 g/cm$^3$, preferably, from 3.6 g/cm$^3$ to 3.8 g/cm$^3$. Moreover, a relative density of the alumina ceramic is from 90% to 98%, preferably, from 94% to 97%. A mean diameter of the ceramic crystal grains of each of the gap forming surface M1, the gap forming surface M2, the gap forming surface M3, the gap forming surface M4, the gap forming surface M5, and the gap forming surface M6 is from 1 $\mu$m to 7 $\mu$m, preferably, from 2 $\mu$m to 5 $\mu$m.

Figure 5A:
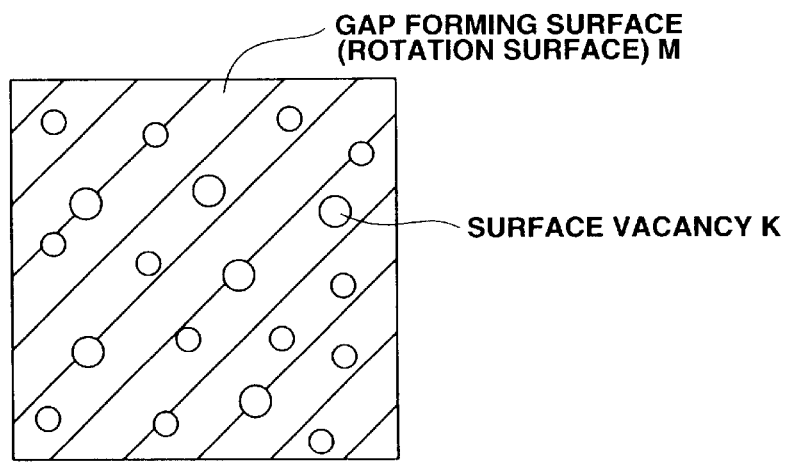
FIG. 5(a) shows a schematic of the dynamic pressure gap forming surface formed with surface vacancies K.
Figure 5B:
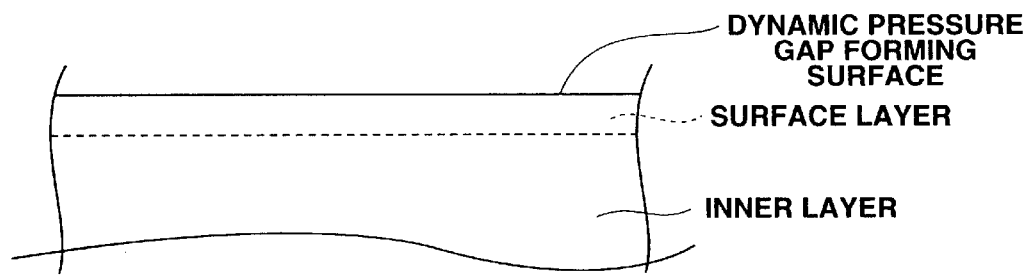
FIG. 5(b) shows a dynamic pressure gap forming surface having an organization of a surface layer and an inner layer.
Figure 5C:
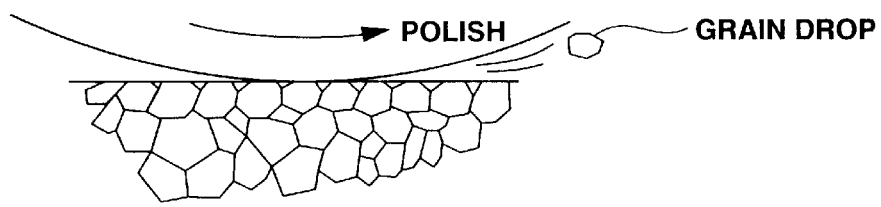
FIG. 5(c) and FIG. 5(d) show steps of forming the surface vacancies with grain drop during polishing.
Figure 5D:
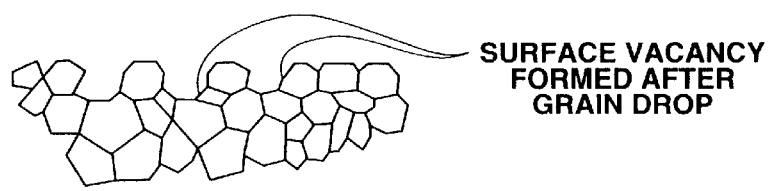
Figure 6:
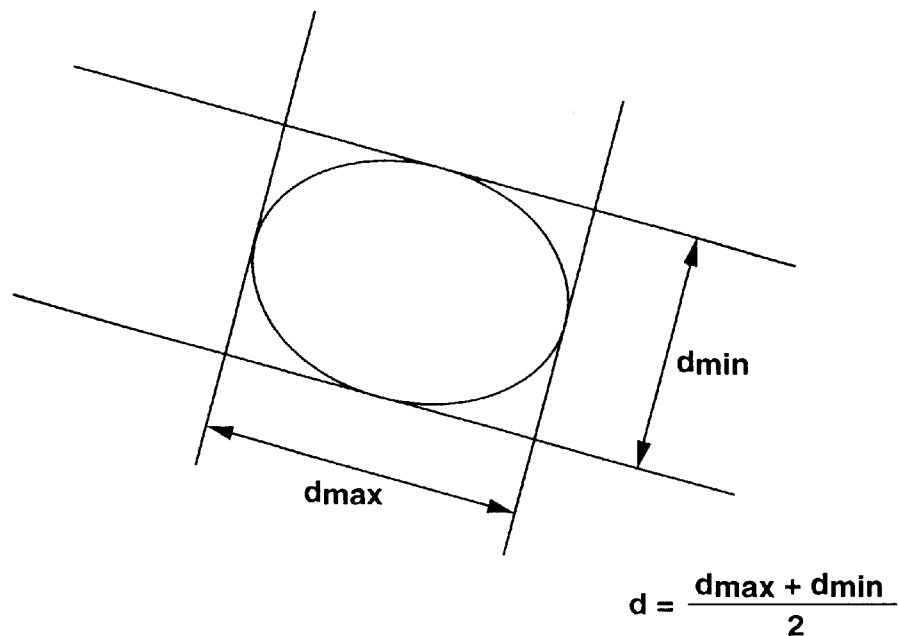
FIG. 6 shows a definition of dimension d of the vacancy (or crystal grain)

As is seen in FIG. 5(a), each of the gap forming surface M1, the gap forming surface M2, the gap forming surface M3, the gap forming surface M4, the gap forming surface M5, and the gap forming surface M6 is formed with a large number of surface vacancies K. A mean dimension of the surface vacancies K is from 2 $\mu$m to 20 $\mu$m. Moreover, on each of the gap forming surface M1, the gap forming surface M2, the gap forming surface M3, the gap forming surface M4, the gap forming surface M5, and the gap forming surface M6, allowing the surface vacancies K (each having dimension from 2 $\mu$m to 20 $\mu$m) to occupy 10% to 60% of the area (M1, M2, M3, M4, M5, M6) contributes to further prevention of adhesion wear or linking. Preferably, the above percentage area by the surface vacancies K is 15% to 40%. The percentage area of the surface vacancies K 10% to 60% (preferably, 15% to 40%) also contributes to increase in fluid dynamic pressure level at the radial gap 17, the first thrust gap 18A and the second thrust gap 18B.

In this case, the mean dimension (from 2 $\mu$m to 20 $\mu$m) and the percentage area {10% to 60% (preferably, 15% to 40%)} of the surface vacancies K are controlled, for example, as follows:

1. On at least one of the gap forming surface M1 and the gap forming surface M2.
2. On at least one of the gap forming surface M3 and the gap forming surface M4.
3. On at least one of the gap forming surface M5 and the gap forming surface M6.

For improving effect, however, more of the gap forming surface M1, the gap forming surface M2, the gap forming surface M3, the gap forming surface M4, the gap forming surface M5, and the gap forming surface M6 is(are) controlled, in terms of the mean dimension (from 2 $\mu$m to 20 $\mu$m) and the percentage area {10% to 60% (preferably, 15% to 40%)} of the surface vacancies K.

Ideally, all of the gap forming surface M1, the gap forming surface M2, the gap forming surface M3, the gap forming surface M4, the gap forming surface M5, and the gap forming surface M6 are controlled, in terms of the mean dimension (from 2 $\mu$m to 20 $\mu$m) and the percentage area {10% to 60% (preferably, 15% to 40%)} of the surface vacancies K.

As is seen in FIG. 2(a), at least one of the gap forming surface M1 and the gap forming surface M2 (for example, the gap forming surface M1 of the main shaft 14) is formed with a recess (groove) (conventional technology) for increasing dynamic pressure level.

Moreover, as is seen in FIG. 2(b), at least one of the gap forming surface M3 and the gap forming surface M4 (for example, the gap forming surface M4 of the thrust plate 21) is formed with a recess (groove) (conventional technology) for increasing dynamic pressure level.

Still furthermore, as is seen in FIG. 2(b), at least one of the gap forming surface M5 and the gap forming surface M6 (for example, the gap forming surface M6 of the thrust plate 23) is formed with a recess (groove) (conventional technology) for increasing dynamic pressure level.

Described hereinafter is in terms of a method of producing the ceramic dynamic pressure bearing 3.

Each of the ceramic members, namely, the main shaft 14, the bearing section 15, the thrust plate 21, and the thrust plate 23 is produced, for example, through the following conventional sintering method:

1. An alumina powder (raw material) having a mean grain diameter 1 $\mu$m to 5 $\mu$m is blended, as sintering assistant (powder), with an oxide powder selected from MgO, CaO, CeO$_2$, SiO$_2$ Na$_2$O and the like, to thereby prepare basis powders for forming.
2. Then, the thus prepared basis powders are subjected to a press molding such as a metal molding and a cool hydrostatic pressure press (conventional technology), into a required form.
3. The thus molded body (compact) is subjected to the sintering at 1,400° C. to 1,700° C., to thereby obtain a sintered body.

The sintered body is subjected to an operation for polishing a surface in an area which is required for the dynamic pressure gap forming surface, to thereby finish the sintered body with a predetermined dimension.

More specifically, a high speed grinding (circumferential speed 1,000 m/s to 2,000 m/s) with a diamond grind stone (for example, yarn count: #100 to #200) is carried out on the following areas 1) to 5), as is seen in FIG. 4(*a*):

1) The inner periphery of the through hole 15*a* of the bearing section 15.
2) The first end surface {upper in FIG. 4(*a*)} and the second end surface {lower in FIG. 4(*a*)} of the bearing section 15.
3) The outer periphery of the main shaft 14.
4) The first end surface (of the thrust plate 21) opposed to the first end surface {upper in FIG. 4(*a*)} of the bearing section 15.
5) The first end surface (of the thrust plate 23) opposed to the second end surface {lower in FIG. 4(*a*)} of the bearing section 15.

Moreover, for finishing, each of the above areas 1) to 5) is subjected to a buffing with a diamond abrasive grain (yarn count: #4,000 to #6,000).

Hereinabove, the alumina ceramic material containing alumina 90% to 99.5% by weight (preferably, 92% to 98% by weight) for each of the members brings about conveniences, for the bearing section 15 and the main shaft 14. More specifically described as follows:

Bearing section 15:
1. The cylindricity of the through hole 15*a* is not larger than 1.5 μm.
2. The roundness is not larger than 1.0 μm in the arbitrary cross section perpendicular to the axis of the bearing section 15.

Main shaft 14:
1. The cylindricity of the outer periphery is not larger than 1.0 μm.
2. The roundness is not larger than 0.5 μm in the arbitrary cross section perpendicular to the axis of the main shaft 14.

As is seen in FIG. 5(*c*), the gap forming surface causes a drop of the ceramic crystal grain during the polishing and the buffing, to thereby form the surface vacancies. Mean dimension, distribution, and percentage area of the thus formed surface vacancies are controllable by adjusting the following factors and the like:

1. Mean dimension and distribution of the ceramic crystal grains constituting the sintered body.
2. Dimension (yarn count) of the grind stone and the abrasive grain.
3. Polishing conditions (including period).

Moreover, likeliness of the ceramic crystal grain drop is, as the case may be, sensitive to composition and distribution of grain boundary phase attributable to the sintering assistant. The composition and the distribution of the grain boundary phase are, therefore, taken into account for controlling the polishing conditions. The thus properly controlled polishing conditions are for the purpose of forming preferable surface vacancies.

The ceramic member with the gap forming surface (for causing dynamic pressure) finished as described above has an organization which is formed with the vacancy caused by the ceramic crystal grain drop. The organization is disposed on the surface of the compact sintered body. More specifically, as is seen in FIG. 5(*b*), the organization is special in that an inner layer is more compact than a surface layer which is formed with the surface vacancies. The surface vacancies are effective for prevention of the adhesion wear or linking, and for improvement in the dynamic pressure level. Moreover, with the compact inner layer formed, the ceramic member is improved in strength. Moreover, basically, the surface layer maintains a compact organization, except the portion causing the ceramic crystal grain drop. Therefore, the ceramic sintered body shown in FIG. 5(*b*) is far more improved in wear resistance than, for example, a porous ceramic sintered body that initially has no compact organization.

After finishing each of the gap forming surface M1, the gap forming surface M2, the gap forming surface M3, the gap forming surface M4, the gap forming surface M5, and the gap forming surface M6 for dynamic pressure, a dynamic pressure recess (groove) is formed by sand blast, etching and the like, to thereby prepare the main shaft 14, the bearing section 15, the thrust plate 21, and the thrust plate 23. Moreover, as is seen in FIG. 3, the support section 7, the permanent magnet 9 and the coil 13 are assembled with an adhesive and the like. Herein, the support section 7 is formed into a disk defining a hole 7*a* which mates with the bearing section 15. Moreover, the main shaft 14, the bearing section 15, the thrust plate 21 and the thrust plate 23 are assembled with the bolt 25, to thereby prepare the motor 2. Finally, mounting the polygon mirror 8 to the support section 7 completes assembly of the polygon scanner 1.

The outer periphery of the bearing section 15 (second member) preferably has an arithmetic mean of surface roughness Ra1 not higher than 0.2 μm measured axially and an arithmetic mean of surface roughness Ra2 not higher than 0.2 μm measured circumferentially. Hereinabove, the arithmetic mean of surface roughness is the one that is specified by JIS B 0601, where JIS stands for Japanese Industrial Standard.

In other words, at least one of the arithmetic mean of surface roughness Ra1 and the arithmetic mean of surface roughness Ra2 higher than 0.2 μm may cause eccentricity and the like, to thereby deteriorate accuracy/precision of press fitting a hard disk, the polygon mirror 8, support section (for the hard disk), a support section (for the polygon mirror 8) and the like to the outer periphery of the bearing section 15. With the deteriorated accuracy/precision, the local wear is likely to occur to the gap forming surface M1 and the gap forming surface M2 at starting and shutdown of rotation of the ceramic dynamic pressure bearing 3, and a vibration or the like attributable to the rotational deflection (a maximum amplitude of a measuring point, and is perpendicular to the rotation axis) is also likely to occur.

The arithmetic mean of surface roughness Ra1 and the arithmetic mean of surface roughness Ra2 are preferably small. In view of machining cost, however, a reasonable lower limit of each of the arithmetic mean of surface roughness Ra1 and the arithmetic mean of surface roughness Ra2 is about 0.01 μm.

Coaxiality of the outer periphery of the bearing section 15 (second member) and the through hole 15*a* is preferably controlled not larger than 1 μm. With the coaxiality larger than 1 μm, central axes of the hard disk, the polygon mirror 8 and the like mounting on the outer periphery of the bearing section 15 are likely to cause eccentricity from the rotation axis O of the ceramic dynamic pressure bearing 3. With the eccentricity, the local wear is likely to occur to the gap forming surface M1 and the gap forming surface M2 at starting and shutdown of rotation of the ceramic dynamic pressure bearing 3, and the vibration or the like attributable to the rotational deflection is also likely to occur. Hereinabove, the coaxiality is the one that is specified in item 11.1 in "Attached Table" in JIS B 0021 (1984). When the dynamic pressure recess (groove) is formed, the coaxiality is evaluated by excluding an area covered by the dynamic pressure recess (groove).

Hereinafter described is an operation of the polygon scanner 1.

The motor 2 is so constituted as to act as an alternating current induction motor. As is seen in FIG. 3, with the coil 13 energized, the polygon scanner 1 is turned integrally with the bearing section 15 and the support section 7. During the turning of the polygon scanner 1, the main shaft 14 acts as a fixed shaft. The maximum speed is not slower than 8,000 rpm. For applications requiring higher scanning speed, the maximum speed reaches not slower than 10,000 rpm, or even not slower than 30,000 rpm (for example, about 50,000 rpm). In view of the rotational load of the polygon mirror 8, the above maximum speed is set from the following factors and the like:

1. Number of turns of the coil 13.
2. External magnetism excited with the permanent magnet 9.
3. Rated drive voltage.

Hereinabove, the radial dynamic pressure around (relative to) the rotation axis O is generated in the radial gap 17 between the main shaft 14 and the bearing section 15, while the thrust dynamic pressure is generated in the first thrust gap 18A (between the thrust plate 21 and the bearing section 15) and the second thrust gap 18B (between the thrust plate 23 and the bearing section 15). Thereby, the rotation axis O of the polygon mirror 8 is supported by means of the members that are kept free from contact with each other, both radially and in a direction of thrust.

Figure 7:
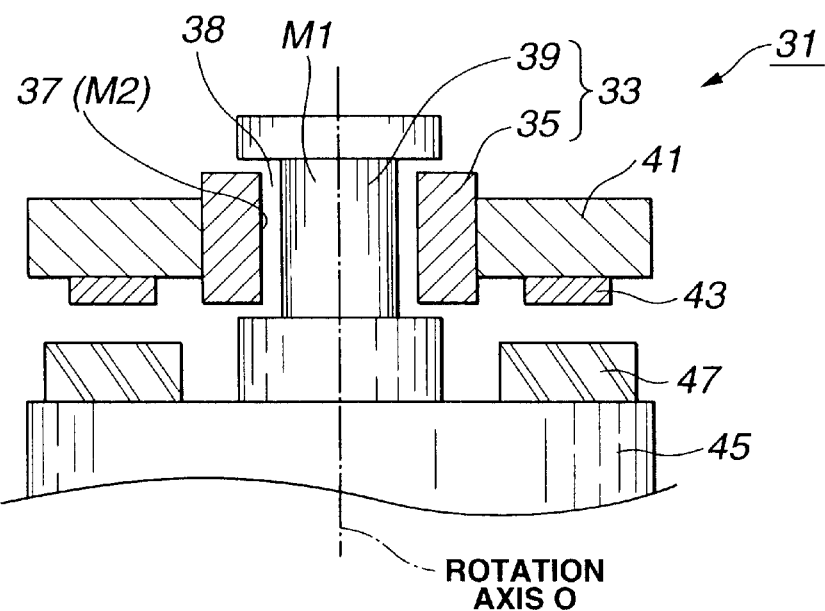
FIG. 7 is a schematic of a cross section of a motor 31 equipped with a ceramic dynamic pressure bearing 33, according to a second embodiment of the present invention.
Figure 8:
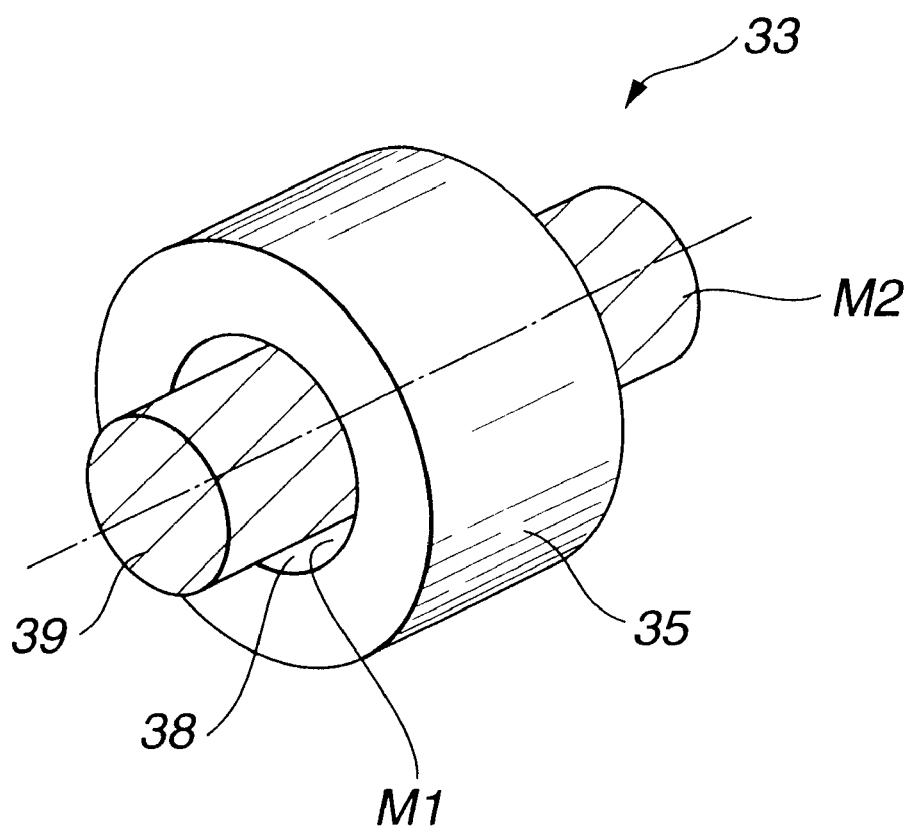
FIG. 8 is a perspective view of the ceramic dynamic pressure bearing 33, according to the second embodiment.

As is seen in FIG. 7, there is provided a motor 31 used for a polygon scanner (not shown), according to a second embodiment of the present invention.

Like the motor 2 and the ceramic dynamic pressure bearing 3 in FIG. 3, the motor 31 in FIG. 7 is constituted of a ceramic dynamic pressure bearing 33.

The ceramic dynamic pressure bearing 33 may have the following constitution:

A cylindrical bearing section 35 (for example, inner diameter larger than 13 mm, outer diameter 25 mm, axial length 5 mm) is formed with a through hole 37. A main shaft 39 (diameter smaller than 13 mm, length 8 mm) penetrates into the through hole 37 in an axial direction of the bearing section 35. Being fixed, the main shaft 39 does not turn. Turning members include the bearing section 35 (disposed around the main shaft 39) and the like. On an outer periphery of the main shaft 39, there is formed the gap forming surface Ml for causing the radial dynamic pressure. On an inner periphery of the bearing section 35, there is formed the gap forming surface M2 for causing the radial dynamic pressure. A radial gap 38 is defined between the gap forming surface Ml and the gap forming surface M2. The bearing section 35 and the main shaft 39 (of the ceramic dynamic pressure bearing 33) in FIG. 7 are axially longer, respectively, than the bearing section 15 and the main shaft 14 (of the ceramic dynamic pressure bearing 3) in FIG. 3. The ceramic dynamic pressure bearing 33 does not have a thrust plate since the radial dynamic pressure is the major support of the rotation axis O.

Like the ceramic dynamic pressure bearing 3 in FIG. 3, the ceramic dynamic pressure bearing 33 in FIG. 7 may have a toroidal support section 41 which is integrated with an outer periphery of the bearing section 35. A permanent magnet 43 is disposed at the support section 41. A coil 47 opposed to the permanent magnet 43 mounts to a base 45. Moreover, at least one of the gap forming surface M1 (of the main shaft 39) and the gap forming surface M2 (of the bearing section 35) may be formed with the dynamic pressure recess (groove). In this case, for example, the gap forming surface Ml is formed with the dynamic pressure recess (groove), as is seen in FIG. 2(*a*).

Figure 9:
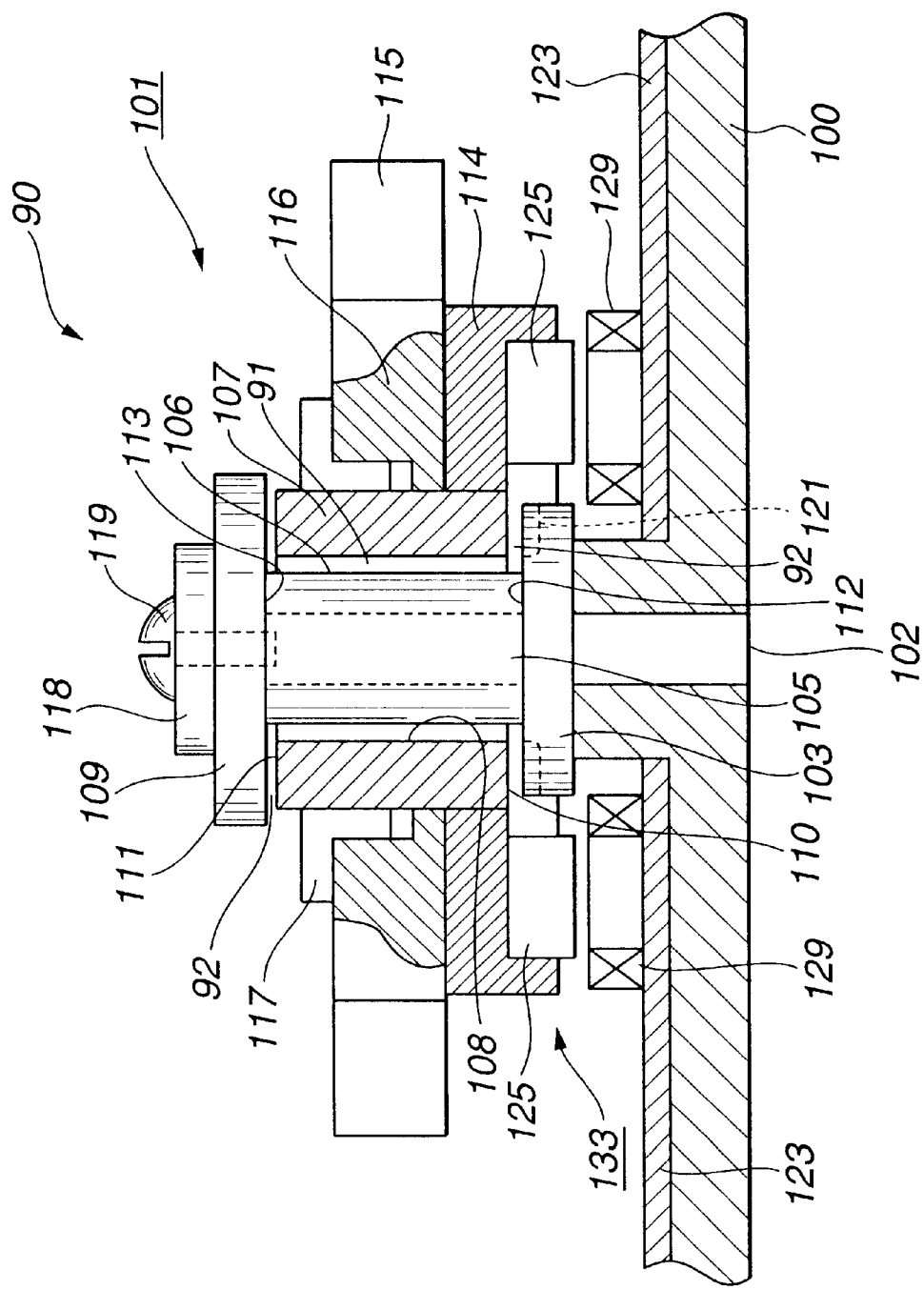
FIG. 9 is a front view of a cross section of a polygon scanner 90 equipped with a ceramic dynamic pressure bearing 101, according to a third embodiment of the present invention.

As is seen in FIG. 9, there is provided a constitution of a polygon scanner 90, according to a third embodiment of the present invention.

A core shaft 102 fixedly supports a ceramic dynamic pressure bearing 101, and has a first end (lower end in FIG. 9) that is vertically fixed to a base 100 of the polygon scanner 90. The core shaft 102 fixedly penetrates through a lower thrust plate 103 made of ceramic. A main shaft 105 made of ceramic fixedly penetrates through the core shaft 102. Moreover, a bearing section 107 made of ceramic has an inner periphery defining a gap forming surface 108 for generating the dynamic pressure, while the main shaft 105 has a cylindrical outer periphery defining a gap forming surface 106 for generating the dynamic pressure. The gap forming surface 108 and the gap forming surface 106 form a radial gap 91 in a range from 1 $\mu$m to 7 $\mu$m. The bearing section 107 is rotatable. Moreover, the core shaft 102 fixedly penetrates through an upper thrust 109 made of ceramic. Moreover, the bearing section 107 has an upper section defining a gap forming surface 111 and a lower section defining a gap forming surface 110. The lower thrust plate 103 defines a gap forming surface 112, while the upper thrust plate 109 defines a gap forming surface 113. A first thrust gap 92 is formed between the gap forming surface 111 and the gap forming surface 113, and a second thrust gap 92 is formed between the gap forming surface 110 and the gap forming surface 112.

According to the third embodiment in FIG. 9, the ceramic for each of the main shaft 105, the bearing section 107, the upper thrust plate 109, and the lower thrust plate 103 is the alumina ceramic. In other words, the alumina ceramic of the ceramic dynamic pressure bearing 101 in FIG. 9 is substantially the same (in terms of organization and composition) as the alumina ceramic of the ceramic dynamic pressure bearing 3 in FIG. 3 and the ceramic dynamic pressure bearing 33 in FIG. 7.

The bearing section 107 has an outer periphery to which a separate support section 114 is fixed. A polygon mirror 116 formed with a number of reflective surfaces 115 is fixed to the support section 114 with a fixture member 117 (Rotors and the support section 114 are allowed to be integrated.). The core shaft 102 has a second end (upper end in FIG. 9) which is fixed to a support seat plate 118 with a bolt 119. Moreover, the lower thrust plate 103 has a gap forming surface 112 formed with a dynamic pressure recess 121 which is same as the one seen in FIG. 2(*b*). Moreover, the main shaft 105 has an outer surface defining a gap forming surface 106 formed with the dynamic pressure recess (groove) (not shown in FIG. 9) which is same as the one seen in FIG. 2(*a*).

A 3-phase brushless motor 133 is disposed on the base 100. The 3-phase brushless motor 133 is constituted of a coil 129 by way of an insulator member 123. The bearing section 107 has the support section 114. A magnet 125 opposed to the coil 129 relative to a rotational direction mounts to a lower portion of the support section 114. With the coil 129 energized, the 3-phase brushless motor 133 functions as a drive motor of the polygon mirror 116, for turning (inductive rotation) the bearing section 107 at high speed. Turing the 3-phase brushless motor 133 generates a dynamic pressure at the radial gap 91, to thereby achieve a high speed and smooth rotation.

When the bearing section 107 stops, the gap forming surface 110 of the bearing section 107 contacts the gap forming surface 112 of the lower thrust plate 103. Moreover, turning the bearing section 107 around the main shaft 105 generates a thrust dynamic pressure at the first thrust gap 92 and the second thrust gap 92. Thereby, the above contact is released, to thereby achieve a high speed rotation.

As is seen in FIG. 4, there is provided a ceramic dynamic pressure bearing applied to a hard disk device 200, according to a fourth embodiment of the present invention.

Figure 10:
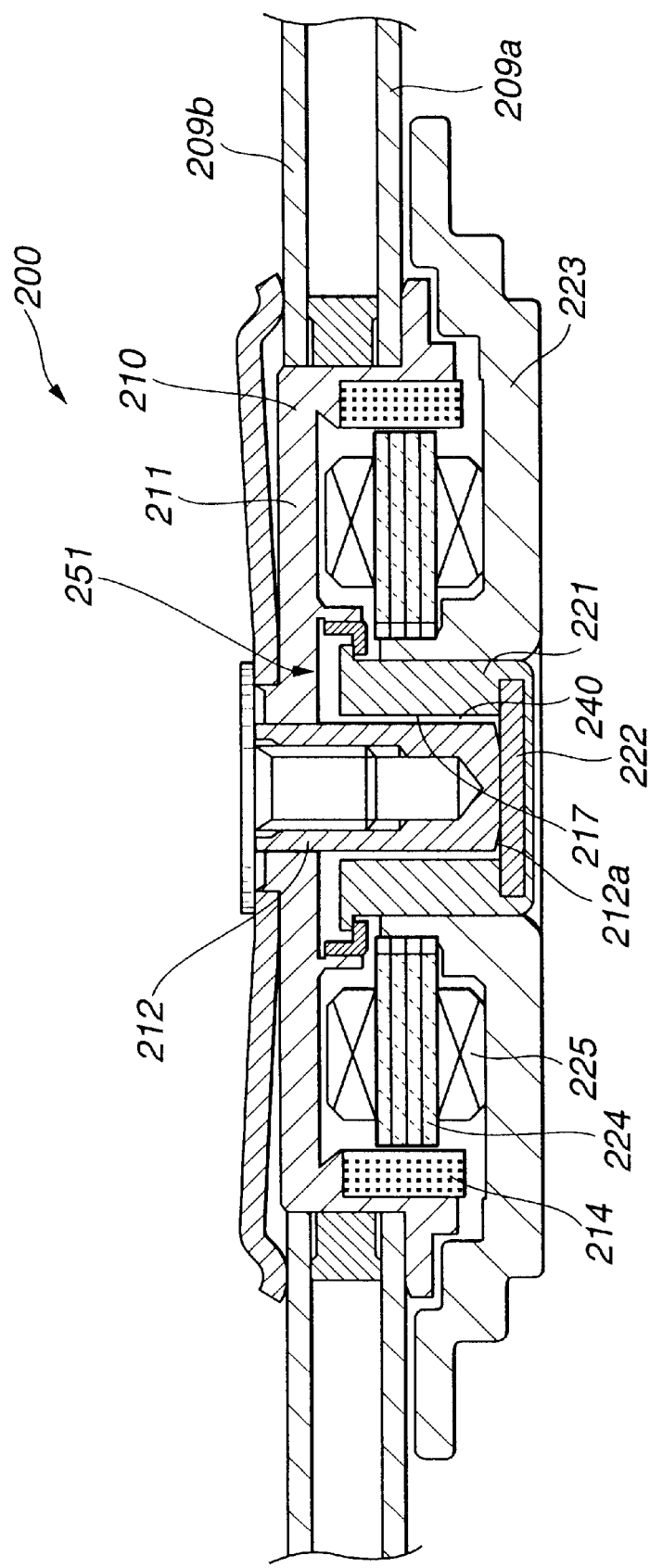
FIG. 10 is a front view of a cross section of a hard disk device 200 equipped with a ceramic dynamic pressure bearing, according to a fourth embodiment of the present invention.
Figure 11:
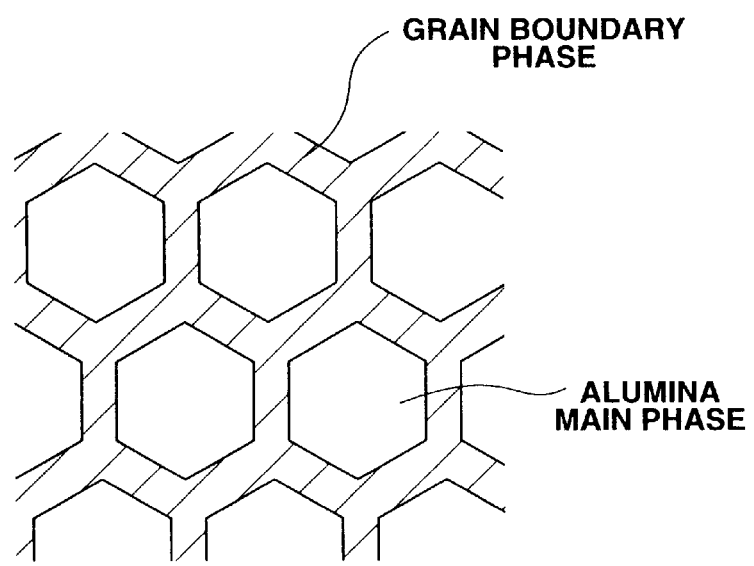
FIG. 11 is a schematic of an organization of an alumina ceramic sintering body.
Figure 12A:
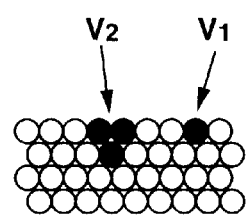
FIG. 12(a) shows a single vacancy V1 and a group vacancy V2.
Figure 12B:
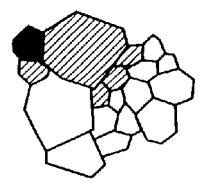
FIG. 12(b) shows crystal grains having various dimensions.

In FIG. 10, the hard disk device 200 has a magnetic disk 209*a* and a magnetic disk 209*b* which are fixed to an outer periphery of a hub 211. The main shaft 212 for rotating a motor is fixed to a center of the hard disk device 200. The hub 211 makes a rotation together with the magnetic disk 209*a* and the magnetic disk 209*b*. The main shaft 212 is supported radially with a fixed bearing section 221 made of alumina ceramic, and supported in a direction of thrust with a thrust plate 222 made of alumina ceramic.

Since the main shaft 212, the fixed bearing section 221 and the thrust plate 222 are made of ceramic, the main shaft 212 and the fixed bearing section 221 have mechanical rigidity sufficient for enduring load and high speed operation caused by the magnet disk 209*a* and the magnet disk 209*b*.

An air is filled in a space defined between the main shaft 212 and the fixed bearing section 221, and a space defined between the main shaft 212 and the thrust plate 222. A radial gap 240 is formed circumferentially in the space defined between the main shaft 212 and the fixed bearing section 221. The fixed bearing section 221 has an inner periphery 217 which is formed with a dynamic pressure recess (groove) (not shown). Turning the main shaft 212 causes a radial dynamic pressure to the radial gap 240, to thereby make a rotation without allowing the main shaft 212 to contact the fixed bearing section 221. An outer periphery of the main shaft 212 and the inner periphery 217 of the fixed bearing section 221 acts as a gap forming surface for radial dynamic pressure. The outer periphery of the main shaft 212 has a constitution same as that of the gap forming surface M1 of the ceramic dynamic pressure bearing 3 in FIG. 3 {FIG. 4(*a*)}, and the gap forming surface M1 of the ceramic dynamic pressure bearing 33 in FIG. 7. The inner periphery 217 has a constitution same as that of the gap forming surface M2 of the ceramic dynamic pressure bearing 3 in FIG. 3 {FIG. 4(*a*)}, and the gap forming surface M2 of the ceramic dynamic pressure bearing 33 in FIG. 7. Moreover, the main shaft 212 has a shaft end 212*a* which is shaped into a spherical pivot, to thereby allow the thrust plate 222 to support a force in the thrust direction.

The hard disk device 200 has a stator core 224 which is fixed to a bracket 223. A stator coil 225 winds around the stator core 224. With an electric current flowing in the stator coil 225, the stator core 224 is magnetized, to thereby cause a rotational magnetic field, and the drive magnet 214 has a multiple of magnetized poles surrounding the stator core 224. Thereby, the stator core 224 and the drive magnet 214 described above generate a rotational drive force of a motor, like the polygon scanner 90 in FIG. 9. The drive magnet 214 is fixed to an inner surface of the hub 211. The drive magnet 214 and the hub 211 constitute a rotor 210.

Hereinabove, in the hard disk device 200, the fixed bearing section 221 is literally a stationary side while the main shaft 212 is literally a rotation side. However, referring to FIG. 3, replacing the polygon mirror 8 with a magnetic disk 408 makes another hard disk device having a constitution in which the bearing section 15 is on a rotation side while the main shaft 14 is on the stationary side.

Although the present invention has been described above by reference to four embodiments, the present invention is not limited to the four embodiments described above. Modifications and variations of the embodiments described above will occur to those skilled in the art, in light of the above teachings.

More specifically, the air used for generating the dynamic pressure can be replaced with a gas other than the air, or other fluid (liquid) such as oil, water and the like.

EXAMPLES

The following experiments were carried out so as to verify effect of the present invention.

At first, each of the bearing section 15, the main shaft 14, the thrust plate 21 and the thrust plate 23 as is seen in FIG. 3 was produced as an alumina ceramic sintered body, in the following manner.

1. Prepare the following raw material:
    Alumina powders (purity: 99.9%) having a mean grain diameter 1.8 μm measured with a laser diffraction grain meter.

2. Prepare sintering assistant powders blending the following three composition:
    CaO powders having a mean grain diameter 4 μm.
    MgO powders having a mean grain diameter 4 μm.
    $SiO_2$ powders having a mean grain diameter 4 μm.
    Each measured with the laser diffraction grain meter.
    Weight ratio $CaO:MgO:SiO_2=3:1:1$ 3. Blend the alumina powders with the sintering assistant powders 0.3% to 15% by weight (in other words, rest: alumina powders).

4. For wet blending, add water and a proper amount of PVA (polyvinyl-alcohol as a binder) to the blended alumina and sintering assistant.

5. For drying, spray on the blended alumina and sintering assistant, to thereby obtain granule raw material basis powders.

6. The granule raw basis material powders were molded into each of the bearing section 15, the main shaft 14, the thrust plate 21 and the thrust plate 23 through a metal press.

7. Subjected to a firing at 1,400° C. to 1,700° C., to thereby obtain a sintered body.

8. The following parts A to E (of the thus obtained sintered body) for the dynamic pressure gap forming surface were subjected to a high speed polishing having the following conditions α and β:
    A. The inner periphery of the through hole 15*a* of the bearing section 15.
    B. The first surface and the second end surface of the through hole 15*a* of the bearing section 15.
    C. The outer periphery of the mains shaft 14.
    D. The surface (of the thrust plate 21) opposed to the bearing section 15.
    E. The surface (of the thrust plate 23) opposed to the bearing section 15.
    α. Diamond grind stone (yarn count: #100 to #200).
    β. Circumferential speed 1,000 m/min.

9. For surface finish, the part A to part E in item 8 above were subjected to a buffing with diamond abrasive grain (yarn count: #2,000 to #6,000).

10. A conventional profile meter was used for measuring the following factor (a) and factor (a):
    (a). Roundness and cylindricity of the inner periphery of the through hole 15*a* of the bearing section 15.
    (b). Roundness and cylindricity of the outer periphery of the main shaft 14.

11. Mask an area other than a recess (groove) pattern area of each of the members, for shot blasting of the recess (groove) pattern area, to thereby form the dynamic pressure recess (groove) as is seen in FIG. 2(a) and FIG. 2(b).

12. On each of the dynamic pressure gap forming surfaces, an area (polished and buffed) free of the dynamic pressure recess (groove) was subjected to an optical microscope for analyzing image in a conventional method.

Through the image analysis, a mean diameter of the alumina crystal grain was calculated.

Moreover, through the image analysis, the percentage area of the surface vacancies each having a dimension from 2 µm to 20 µm was calculated.

13. The apparent density of each of the bearing section 15, the main shaft 14, the thrust plate 21 and the thrust plate 23 was measured through Archimedes' method. Moreover, with the actual density estimated from the blend ratio of the alumina and the sintering assistant, the relative density was calculated.

Each of the bearing section 15, the main shaft 14, the thrust plate 21 and the thrust plate 23 is assembled to the motor 2 as is seen in FIG. 3 to be subjected to the following tests:

1. Briefing of the test:
   Measure rotational deflection of the bearing section 15 which acts as a rotor at a continuous speed 30,000 rpm. Hereinabove, the rotational deflection is defined as a maximum amplitude of a measuring point on the outer periphery (of the bearing section 15), and is perpendicular to the rotation axis O. A laser interferometer was used for the measurement.

2. Acceptance criteria of the rotational deflection:
   The following acceptance criteria were provided:
   Excellent: Rotational deflection smaller than 0.1 µm.
   Good: Rotational deflection 0.1 µm to smaller than 0.2 µm.
   Acceptable: Rotational deflection 0.2 µm to smaller than 0.3 µm.
   Rejected: Rotational deflection not smaller than 0.3.

3. Test procedures:
   1) Accelerate rotation of the bearing section 15 from stationary to 30,000 rpm.
   2) Keep the bearing section 15 for 1 minute. * 1) and 2) are defined as one cycle.
   3) Repeat 100,000 cycles.

4. Acceptance criteria of adhesion wear to the dynamic pressure gap forming surface:
   Excellent: No adhesion wear was found during the cycle (to the end of the cycle).
   Good: An extremely small amount of adhesion wear was found at the end of the cycle.
   Acceptable: A small amount of adhesion wear was found at the end of the cycle, without causing any failures.
   Rejected: Too large adhesion wear was found during the cycle, to thereby discontinue test.

5. Rockwell hardness test was carried out on the thrust dynamic pressure gap forming surface of the bearing section 15, according to JIS Z 2245 (1992) specifying an applied load 15 N.

The test results are shown in the following Table 1 and Table 2.

TABLE 1

|   | Alumina content (% weight) | Crystal grain diameter of sintered body (µm) | Apparent density of sintered body (g/cm³) | Relative density of sintered body (%) | Rockwell hardness. | Percentage area of surface vacancies from 2 µm to 20 µm | Yarn count of grind stone |
|---|---|---|---|---|---|---|---|
| 1* | 85.0 | 10.0 | 3.30 | 83 | 91 | 57 | 6,000 # |
| 2  | 90.0 | 7.0  | 3.59 | 90 | 94 | 36 | 6,000 # |
| 3  | 95.0 | 3.0  | 3.72 | 93 | 95 | 23 | 2,000 # |
| 4  | 95.0 | 3.0  | 3.72 | 93 | 95 | 22 | 3,000 # |
| 5  | 95.0 | 3.0  | 3.72 | 93 | 95 | 21 | 4,000 # |
| 6  | 95.0 | 3.0  | 3.72 | 93 | 95 | 21 | 5,000 # |
| 7  | 95.0 | 3.0  | 3.72 | 93 | 95 | 21 | 6,000 # |

Remark: *Not covered under the present invention.

TABLE 2

|   | Inner surface of through hole 15a of bearing section 15 | | Outer surface of main shaft 14 | | | |
|---|---|---|---|---|---|---|
|   | Roundness (µm) | Cylindricity (µm) | Roundness (µm) | Cylindricity (µm) | Rotational deflection | Adhesion wear |
| 1* | 1.5 | 2.0 | 1.0 | 1.5 | Rejected  | Rejected  |
| 2  | 1.0 | 1.5 | 0.5 | 1.0 | Good      | Good      |
| 3  | 0.8 | 1.3 | 0.4 | 0.7 | Good      | Good      |
| 4  | 0.6 | 1.0 | 0.5 | 0.7 | Excellent | Excellent |
| 5  | 0.4 | 0.8 | 0.3 | 0.6 | Excellent | Excellent |
| 6  | 0.2 | 0.5 | 0.2 | 0.5 | Excellent | Excellent |
| 7  | 0.1 | 0.5 | 0.1 | 0.5 | Excellent | Excellent |

Remark: *Not covered under the present invention.

As Table 1 and Table 2 show, the alumina content 90% to 99.5% allows inner surface of the through hole 15a of the bearing section 15 to have the cylindricity not larger than 1.5 μm and the roundness not larger than 1.0 μm in the arbitrary cross section perpendicular to the axis of the bearing section 15.

Moreover, the alumina content 90% to 99.5% allows the outer surface of the main shaft 14 to have the cylindricity not larger than 1.0 μm and the roundness not larger than 0.5 μm in the arbitrary cross section perpendicular to the axis of the main shaft 14.

Furthermore, the roundness and the cylindricity within the allowance limits are likely to prevent the rotational deflection and the adhesion wear.

The entire contents of basic Japanese Patent Application No. P2001-065000 (filed on Mar. 8, 2001) of which priority is claimed is incorporated herein by reference.

The scope of the present invention is defined with reference to the following claims.

What is claimed is:

1. A ceramic dynamic pressure bearing, comprising:
    a first member having a substantially cylindrical outer periphery which is formed with a gap forming surface for causing a radial dynamic pressure, the first member being composed of an alumina ceramic comprising:
        an aluminum in a range from 90% to 99.5% by weight, the figures in % being an $Al_2O_3$ conversion, and
        an oxide sintering assistant in a range from 0.5% to 10% by weight, the figures in % being an oxide conversion,
        the outer periphery of the first member having a cylindricity not larger than 1.0 μm, and a roundness not larger than 0.5 μm which is measured in an arbitrary cross section perpendicular to an axis of the first member; and
    a second member having an inner periphery defining a substantially cylindrical through hole which is formed with a gap forming surface for causing the radial dynamic pressure, the first member being inserted into the through hole of the second member in such a manner as to form a radial gap between the gap forming surface of the first member and the gap forming surface of the second member, the first member and the second member making a rotation relative to each other so as to cause a fluid dynamic pressure at the radial gap, the second member being composed of the alumina ceramic comprising:
        the aluminum in the range from 90% to 99.5% by weight, the figures in % being the $Al_2O_3$ conversion, and
        the oxide sintering assistant in the range from 0.5% to 10% by weight, the figures in % being the oxide conversion,
        the inner periphery defining the through hole of the second member having a cylindricity not larger than 1.5 μm, and a roundness not larger than 1.0 μm which is measured in an arbitrary cross section perpendicular to an axis of the second member.

2. The ceramic dynamic pressure bearing as claimed in claim 1, in which the alumina ceramic of each of the first member and the second member has an apparent density in a range from 3.5 g/cm$^3$ to 3.9 g/cm$^3$.

3. The ceramic dynamic pressure bearing as claimed in claim 2, in which the alumina ceramic of each of the first member and the second member has the apparent density in a range from 3.6 g/cm$^3$ to 3.9 g/cm$^3$.

4. The ceramic dynamic pressure bearing as claimed in claim 3, in which the alumina ceramic of each of the first member and the second member has the apparent density in a range from 3.6 g/cm$^3$ to 3.8 g/cm$^3$.

5. The ceramic dynamic pressure bearing as claimed in claim 1, in which
    the second member has a first end surface and a second end surface in a direction along a rotation axis of the ceramic dynamic pressure bearing,
    the ceramic dynamic pressure bearing further comprises a thrust plate having a first surface which is opposed to at least one of the first end surface and the second end surface of the second member, and
    the first surface of the thrust plate defines a gap forming surface for causing a thrust dynamic pressure while the at least one of the first end surface and the second end surface of the second member defines a gap forming surface for causing the thrust dynamic pressure, in such a manner as to form a thrust gap therebetween.

6. The ceramic dynamic pressure bearing as claimed in claim 5, in which a dynamic pressure recess is formed on the gap forming surface for causing the thrust dynamic pressure.

7. The ceramic dynamic pressure bearing as claimed in claim 1, in which a surface vacancy on the gap forming surface composed of the alumina ceramic has a mean dimension larger than a mean dimension of a crystal grain of the alumina ceramic.

8. The ceramic dynamic pressure bearing as claimed in claim 1, in which a surface vacancy on the gap forming surface composed of the alumina ceramic has a mean dimension in a range from 2 μm to 20 μm.

9. The ceramic dynamic pressure bearing as claimed in claim 8, in which
    the gap forming surface is coated with a film which is thinner than the mean dimension of the surface vacancy,
    the film is an amorphous carbon which is mainly made of a hard carbon, and
    the hard carbon film constitutes an amorphous skeleton, and has Vickers hardness not lower than 1,500 kg/mm$^2$.

10. The ceramic dynamic pressure bearing as claimed in claim 8, in which the surface vacancy on the gap forming surface composed of the alumina ceramic has the mean dimension in a range from 5 μm to 15 μm.

11. The ceramic dynamic pressure bearing as claimed in claim 1, in which the gap forming surface composed of the alumina ceramic has a percentage area of a crystal grain having the diameter 2 μm to 5 μm not smaller than 40%.

12. The ceramic dynamic pressure bearing as claimed in claim 1, in which a dynamic pressure recess is formed on the gap forming surface for causing the radial dynamic pressure.

13. The ceramic dynamic pressure bearing as claimed in claim 1, in which the alumina ceramic of each of the first member and the second member has a mean diameter of a crystal grain in a range from 1 μm to 7 μm.

14. The ceramic dynamic pressure bearing as claimed in claim 1, in which the ceramic dynamic pressure bearing is used for bearing a main shaft for rotating a hard disk of a hard disk device.

15. The ceramic dynamic pressure bearing as claimed in claim 1, in which the ceramic dynamic pressure bearing is used for bearing a main shaft for rotating a polygon mirror of a polygon scanner.

16. The ceramic dynamic pressure bearing as claimed in claim 1, in which
    the aluminum of each of the first member and the second member is in a range from 92% to 98% by weight; and
    the oxide sintering assistant of each of the first member and the second member is in a range from 2% to 8% by weight.

17. The ceramic dynamic pressure bearing as claimed in claim 16, in which
  the aluminum of each of the first member and the second member is in a range from 93% to 97% by weight; and
  the oxide sintering assistant of each of the first member and the second member is in a range from 3% to 7% by weight.

18. The ceramic dynamic pressure bearing as claimed in claim 1, in which the alumina ceramic of each of the first member and the second member has a relative density not lower than 90%.

19. The ceramic dynamic pressure bearing as claimed in claim 18, in which the alumina ceramic of each of the first member and the second member has the relative density in a range from 90% to 98%.

20. The ceramic dynamic pressure bearing as claimed in claim 19, in which the alumina ceramic of each of the first member and the second member has the relative density in a range from 94% to 97%.

21. The ceramic dynamic pressure bearing as claimed in claim 1, in which a surface vacancy on the gap forming surface composed of the alumina ceramic having a dimension in a range from 2 $\mu$m to 20 $\mu$m has a percentage area in a range from 10% to 60%.

22. The ceramic dynamic pressure bearing as claimed in claim 21, in which the surface vacancy on the gap forming surface composed of the alumina ceramic having the mean dimension in the range from 2 $\mu$m to 20 $\mu$m has the percentage area in a range from 15% to 40%.

23. The ceramic dynamic pressure bearing as claimed in claim 22, in which the surface vacancy on the gap forming surface composed of the alumina ceramic having the mean dimension in the range from 2 $\mu$m to 20 $\mu$m has the percentage area in a range from 20% to 40%.

24. The ceramic dynamic pressure bearing as claimed in claim 1, in which
  the alumina ceramic is a ceramic sintered body which is so compact as to have a relative density not lower than 90%, and
  a vacancy in the ceramic sintered body has a dimension in a range from 2 $\mu$m to 20 $\mu$m, and is disposed locally in a form of a surface vacancy on the gap forming surface.

25. The ceramic dynamic pressure bearing as claimed in claim 24, in which the surface vacancy is formed in such a manner that a crystal grain of the alumina ceramic drops at a process of finishing the gap forming surface.

26. The ceramic dynamic pressure bearing as claimed in claim 1, in which
  the radial gap is calculated by the following formula:
    (D2−D1)/2, where D2 is an inner diameter of the through hole while D1 is an outer diameter of the first member, and
  the radial gap thus calculated is in a range from 2 $\mu$m to 6 $\mu$m.

27. The ceramic dynamic pressure bearing as claimed in claim 1, in which
  each of the outer periphery of the first member and the inner periphery of the second member forms a taper smaller than 2 $\mu$m, and
  the taper is calculated by the following formula:
    ($\delta$1−$\delta$2)/2, where $\delta$1 is a diameter at a side end defining a larger diameter of each of the first member and the second member while $\delta$2 is a diameter at a side end defining a smaller diameter of each of the first member and the second member.

28. The ceramic dynamic pressure bearing as claimed in claim 1, in which
  the second member has an outer periphery which has an arithmetic mean of surface roughness in a range from 0.01 $\mu$m to 0.2 $\mu$m measured axially and an arithmetic mean of surface roughness in a range from 0.01 $\mu$m to 0.2 $\mu$m measured circumferentially, and
  the arithmetic mean of surface roughness is specified by JIS B 0601, where JIS stands for Japanese Industrial Standard.

29. The ceramic dynamic pressure bearing as claimed in claim 1, in which
  the second member (15, 35, 107, 221) has an outer periphery which defines a coaxiality with the through hole not larger than 1 $\mu$m, and
  the coaxiality is specified by JIS B 0021 (1984), where JIS stands for Japanese Industrial Standard.

30. A motor comprising a ceramic dynamic pressure bearing as claimed in claim 1, in which the ceramic dynamic pressure bearing is used for bearing an output section of the motor.

31. The motor as claimed in claim 30, in which the motor is used for rotatably driving a hard disk of a hard disk device.

32. A hard disk device, comprising:
  a motor as claimed in claim 31, the motor comprising a ceramic dynamic pressure bearing as claimed in claim 1; and
  a hard disk rotatably driven by the motor.

33. The motor as claimed in claim 30, in which the motor is a high speed motor with a speed not slower than 8,000 rpm.

34. The motor as claimed in claim 30, in which the motor is used for driving a polygon mirror of a polygon scanner.

35. A polygon scanner, comprising:
  a motor as claimed in claim 34, the motor comprising a ceramic dynamic pressure bearing as claimed in claim 1; and
  a polygon mirror rotatably driven by the motor.

* * * * *